United States Patent
Kumta et al.

(10) Patent No.: US 10,826,114 B2
(45) Date of Patent: Nov. 3, 2020

(54) CATHODES AND ELECTROLYTES FOR RECHARGEABLE MAGNESIUM BATTERIES AND METHODS OF MANUFACTURE

(71) Applicant: UNIVERSITY OF PITTSBURGH—OF THE COMMONWEALTH SYSTEM OF HIGHER EDUCATION, Pittsburgh, PA (US)

(72) Inventors: Prashant N. Kumta, Pittsburgh, PA (US); Partha Saha, Pittsburgh, PA (US); Moni Kanchan Datta, Pittsburgh, PA (US); Ayyakkannu Manivannan, Morgantown, WV (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 0 days.

(21) Appl. No.: 15/897,721

(22) Filed: Feb. 15, 2018

(65) Prior Publication Data

US 2018/0175441 A1     Jun. 21, 2018

Related U.S. Application Data

(62) Division of application No. 14/325,891, filed on Jul. 8, 2014, now Pat. No. 9,947,962.

(60) Provisional application No. 61/843,647, filed on Jul. 8, 2013.

(51) Int. Cl.
| | | |
|---|---|---|
| H01M 10/054 | (2010.01) | |
| H01M 4/58 | (2010.01) | |
| C01G 39/06 | (2006.01) | |
| C01G 39/00 | (2006.01) | |
| H01M 10/052 | (2010.01) | |
| C01B 19/00 | (2006.01) | |
| H01M 4/02 | (2006.01) | |

(52) U.S. Cl.
CPC ......... *H01M 10/054* (2013.01); *C01B 19/002* (2013.01); *C01B 19/007* (2013.01); *C01G 39/006* (2013.01); *C01G 39/06* (2013.01); *H01M 4/581* (2013.01); *H01M 4/5815* (2013.01); *H01M 10/052* (2013.01); *C01P 2002/30* (2013.01); *C01P 2002/72* (2013.01); *C01P 2002/76* (2013.01); *C01P 2002/77* (2013.01); *C01P 2004/38* (2013.01); *C01P 2004/61* (2013.01); *C01P 2004/62* (2013.01); *C01P 2006/12* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 4,894,302 A | 1/1990 | Hoffman et al. | |
| 4,966,749 A * | 10/1990 | Kondo | C01B 17/20 419/10 |
| 6,316,141 B1 | 11/2001 | Aurbach et al. | |
| 8,318,354 B2 | 11/2012 | Muldoon et al. | |
| 2001/0049060 A1 | 12/2001 | Aurbach et al. | |
| 2005/0220699 A1* | 10/2005 | Gofer | C01G 39/00 423/561.1 |
| 2008/0182176 A1* | 7/2008 | Aurbach | B82Y 30/00 429/337 |
| 2011/0159381 A1* | 6/2011 | Doe | H01M 4/13 429/337 |
| 2011/0244338 A1 | 10/2011 | Muldoon et al. | |

OTHER PUBLICATIONS

Nanjundaswanny, KS, Convenient synthesis of the chevrel phases MxMo6S8 (M=Cu, Pb, La, or Gd), Inorg Chem, 26, 4286-4288 (Year: 1987).*

K.S.Nanjundaswamy et al., Convenient Synthesis of the Chevrel Phases MxMo6S8 (M=Cu, Pb, La, or Gd), 1987, Inorg. Chem, 26, 4286-4288.

* cited by examiner

*Primary Examiner* — Daniel S Gatewood
(74) *Attorney, Agent, or Firm* — Eckert Seamans Cherin & Mellott, LLC

(57) ABSTRACT

The invention relates to Chevrel-phase materials and methods of preparing these materials utilizing a precursor approach. The Chevrel-phase materials are useful in assembling electrodes, e.g., cathodes, for use in electrochemical cells, such as rechargeable batteries. The Chevrel-phase materials have a general formula of $Mo_6Z_8$ and the precursors have a general formula of $M_xMo_6Z_8$. The cathode containing the Chevrel-phase material in accordance with the invention can be combined with a magnesium-containing anode and an electrolyte.

15 Claims, No Drawings

CATHODES AND ELECTROLYTES FOR RECHARGEABLE MAGNESIUM BATTERIES AND METHODS OF MANUFACTURE

CROSS-REFERENCE TO RELATED APPLICATIONS

This divisional patent application claims priority from U.S. patent application Ser. No. 14/325,891, filed Jul. 8, 2014, which claims priority under 35 U.S.C. § 119(e) to U.S. Provisional Patent Application Ser. No. 61/843,647, filed Jul. 8, 2013, entitled "Cathodes and Electrolytes for Rechargeable Magnesium Batteries and Methods of Manufacture", which are herein incorporated by reference.

GOVERNMENT FUNDING

This invention was made with government support under grant #DE-FE0004000 awarded by the Department of Energy-NETL. The government has certain rights in the invention.

1. FIELD OF THE INVENTION

The invention relates to Chevrel-phase materials and methods for their preparation, and to secondary electrochemical cells utilizing a magnesium-containing anode and a Chevrel-phase-containing cathode.

2. BACKGROUND

High energy density, rechargeable electrochemical cells are known in the art. A rechargeable cell is theoretically capable of charging and discharging indefinitely. In producing a rechargeable battery system, a material for the cathode is selected. In certain instances, the cathode material is in the form of a liquid which allows reactions to readily take place. However, when in the form of a liquid, provisions are made to keep the cathode active material away from the anode, otherwise self-discharge can occur. As an alternative, the cathode material can be in the form of a solid which is essentially insoluble in the electrolyte. The solid cathode material is selected such that it absorbs and desorbs the anode ion because solubility of the anode ion occurs reversibly during operation of the cell. Such a solid cathode can be capable of intercalation of ions which are solubilized by the electrolyte. The electrolyte is selected to permit electroplating of solubilized ions at the anode. The plating of ions at the anode occurs during recharge of the cell and the intercalation of the cathode occurs during discharge of the cell.

Chevrel-phase compounds (CPs), also referred to as Chevrel materials, include an invariant portion which may consist essentially of molybdenum and a chalcogen. The chalcogen can be selected from elements in Group 16 of the Periodic Table, including sulfur, selenium, tellurium or mixtures of these, with or without minor amounts of oxygen. Ordinarily, this fixed portion has a stoichiometric formula of $Mo_6Z_y$, where Z represents the chalcogen and y is usually between about 7.5 and 8.5, most typically about 8. The unique crystal structure of the materials permits intercalation of metals, so that the overall stoichiometry of the Chevrel-phase material can be represented as $M_xMo_6Z_y$, where M represents the intercalated metal and x may vary from 0 (no intercalated metal) to an upper limit which may be about 4 or less depending upon the particular metal.

Ternary CPs are a unique class of cluster compounds which exhibit remarkable magnetic, thermoelectric, catalytic, and superconductive properties. The crystal structure of CPs consists of $Mo_6$—octahedron clusters surrounded by eight chalcogen (e.g., S or Se) atoms at the corners of a distorted cube. For example, $Mo_6S_8$ units are linked with each other and form a three-dimensional framework with open cavities/channels that can be filled with wide-variety of guest atoms and form ternary CPs $M_xMo_6S_8$ (0<x<4). However, $Mo_6S_8$ binary CPs cannot be synthesized directly and indirectly stabilized via leaching metal from their ternary counterparts. $Mo_6Se_8$ binary CPs include an iso-structure wherein $Mo_6Se_8$ clusters are rotated approximately 26° about the body diagonal ($\overline{3}$ axis) of the rhombohedral symmetry ($R\overline{3}$) which allows for bonding of Se atoms of one cluster to a Mo atom of a neighboring unit. The resultant three-dimensional $Mo_6Se_8$ framework has open cavities/sites that can be filled completely in the $M_xMo_6Se_8$ CPs into triclinic ($P\overline{1}$) forms due to intrinsic lattice instabilities. Among the three different families of CPs ($Mo_6Z_8$, Z=S, Se, Te), sulfide CPs have high ionic mobility at room temperature which allows them to transport monovalent ($Li^+$, $Na^+$) and bivalent ($Mg^{2+}$) cations, and to act as a cathode for rechargeable batteries.

Energy is released upon intercalation of the metal into the CPs and as the intercalation process is partially or wholly reversible with certain metals, the CPs can be used as cathodes in electrochemical cells.

A cell with a lithium anode and a Chevrel-phase cathode of the formula $Li_xMo_6S_8$ can be subjected to a charge cycle in which lithium is removed from the Chevrel-phase by the applied electrical energy. In a discharge cycle, the lithium is re-intercalated into the Chevrel-phase releasing energy as electrical energy. The reaction mixture containing lithium, molybdenum and sulfur for direct formation of the lithium-intercalated CPs can be prepared by heating a precursor mixture. The precursor mixture including a heat-liable lithium compound together with molybdenum and sulfur, typically as a mixture of $MoS_2$ and free Mo. Upon heating, the heat-labile compound yields volatile decomposition products which may be swept from the mixture, e.g., by a stream of inert gas, leaving behind the lithium, molybdenum and sulfur to form the Chevrel-phase material.

Intercalation reactions in typical battery development have focused on the use of alkali metals, specifically lithium as anodes. In comparison, there has been less research with respect to the use of alkaline earth metals, such as magnesium, for use as anodes and the use of cathodes capable of intercalation of alkaline earth metal ions.

It is known in the art to use lithium ion batteries for a wide variety of energy storage applications due to their very high energy density and flexible design. In considering alternative materials to lithium in producing electrochemical batteries, it is acknowledged that magnesium-based energy storage systems may be considered suitable alternatives because magnesium is environmentally safe, cost effective and abundant in the earth's crest. Further, magnesium is bivalent and theoretically capable of rendering higher volumetric capacity than lithium.

It has been found that conventional salts like $Mg(ClO_4)_2$, $Mg(CF_3SO_3)_2$, $Mg[(CF_3SO_2)_2N]_2$ and the like, in various non-aqueous solvents develop surface passivation on a magnesium anode and effectively block $Mg^{2+}$ transport. Relatively fast and easy intercalation of $Mg^{2+}$ ions at room temperature makes CPs a preferred material of the cathode for magnesium batteries. However, synthesis of thermodynamically unstable $Mo_6S_8$ is challenging. Typically, CuCP ($Cu_xMo_6S_8$) is synthesized by solid state reactions of elemental blends of copper, molybdenum, and $MoS_2$ powders in an evacuated quartz ampoules at a temperature of approximately 1150° C. for one week or by a molten salt approach including heat treatment at approximately 850° C. for about 60 hours under an argon atmosphere. Both of these approaches require chemical leaching in solution for several days at room temperature for complete removal of the copper.

The conventional methods are not convenient approaches for large scale manufacturing process. For example, an elemental blend sealed in evacuated quartz ampoule and heated at high temperature (~1273 K) for a long duration (~7 days) to obtain $Cu_xMo_6S_8$ results in high manufacturing costs. Further, a significant disadvantage is the high vapor pressure of sulfur inside the ampoule during heating which causes a safety hazard. Furthermore, the final product obtained from the quartz ampoule has non-stoichiometry and excess sulfur that may be required to compensate for sulfur vapor loss during heating. Attempts to use metal sulfide ($CuS$, $MoS_2$) instead of elemental sulfur to avoid the high vapor pressure, has resulted in a synthesis time which is unreasonably long for amenable large-scale production. Moreover, it was found that there can be difficulty in forming a reaction product at high temperature, e.g., the Chevrel phase may not be obtained and instead a sulfur deficient phase can form.

In an attempt to reduce total synthesis duration during the solid-state reaction method, cold-pressing and hot pressing have been employed as alternative means for the synthesis of a $Cu_xMo_6S_8$ phase. Neither the milling time nor the sintering temperature has been optimized for the synthesis of $Cu_xMo_6S_8$. However, it was found that pressure-assisted sintering at elevated temperature ~1123-1473 K was capable of reducing the synthesis duration to ~5-8 hours as compared to 7 days required for solid-state synthesis in an evacuated quartz ampoule.

CPs also have been synthesized from soluble sulfide precursor, e.g., polythiomolybdate and metal salt, which form a chelated complex in ether or methanol solvent and directly forms the desired $Cu_2Mo_6S_8$ phase when heated at ~1073-1273 K under hydrogen atmosphere. An alternative soluble precursor method was proposed for the synthesis of nickel and lithium ternary CPs.

Obtaining $Mo_6S_8$ CPs from known soluble sulfide precursor methods requires the use of hydrogen gas during sulfurization. Final reduction of sulfur compounds to desired Chevrel phase at elevated temperature needs strict regulation and skills, and poses a safety concern for the synthesis of CPs.

Thus, there is a need for improvements in electrochemical cells incorporating Chevrel-phase cathodes and in the synthesis methods for the CPs, and furthermore in the use of alkaline earth metals, such as magnesium, as anodes. Moreover, there is a need in the art to develop time-saving approaches and methods for the direct synthesis of CPs. In this respect, high energy mechanical milling (HEMM) may be employed as a scalable, time-saving approach for direct synthesis of ternary metal CPs ($M_xMo_6Z_8$; Z=S, Se) using MZ, Mo, and $MoZ_2$ as the precursor. The invention provides easy, rapid and facile precursor approaches for the synthesis of CPs for use as a cathode and magnesium-containing material for use as an anode in an electrochemical cell.

SUMMARY OF THE INVENTION

In one aspect, the invention provides an electrochemical cell including an alkali metal-containing anode, a cathode and an electrolyte. The cathode includes a Chevrel-phase material of a formula $Mo_6Z_8$ derived from a precursor material of a formula $M_xMo_6Z_8$, wherein M is a metallic element, x is a number from 1 to 4 and, Z is a chalcogen with or without a presence of oxygen.

In certain embodiments, the alkali-metal-containing anode comprises magnesium.

In certain embodiments, the metallic element M can be selected from Li, Na, Mg, Ca, Sc, Cr, Mn, Fe Co, Ni, Cu, Zn, Sr, Y, Pd, Ag, Cd, In, Sn, Ba, La, Pb, Ce, Pr, Nd, Sm, Eu, Gd, Tb, Dy, Ho, Er, Tm, Yb, Lu and mixtures thereof.

The chalcogen Z can be selected from chemical elements in Group 16 of the Periodic Table, including sulfur, selenium, tellurium and mixtures thereof. Further, Z can be sulfur, selenium, tellurium or a mixture thereof, with or without a presence of oxygen.

In certain embodiments, M is copper, x is 2 and Z is sulfur.

The precursor material can be formed from a mixture of MZ, $MoZ_2$ and molybdenum.

The Chevrel-phase material can be of a formula $Mo_6S_8$ which is derived from a precursor material of $Cu_2Mo_6S_8$ and said precursor material $Cu_2Mo_6S_8$ can be derived from a mixture of ammonium tertathiomolybdate and anhydrous $CuCl_2$ in the presence of anhydrous N,N-dimethylformamide.

The electrolyte can be in the form of an electrolyte solution including electrolyte and solvent. In certain embodiments, the electrolyte solution includes amidomagnesium-based magnesium salt transmetallated with an aluminum salt electrolyte dissolved in the solvent. In other embodiments, the electrolyte solution includes phenyl magnesium chloride-aluminum chloride, amidomagnesium-based magnesium salt transmetallated with an aluminum salt electrolyte, and solvent. The solvent can be tetrahydrofuran.

In yet other embodiments, the electrolyte solution includes 3-bis(trimethylsilyl)aminophenylmagnesium chloride with aluminum chloride in tetrahydrofuran.

The electrochemical cell can be a rechargeable battery.

In another aspect, the invention provides a method of synthesizing a Chevrel-phase cathode material. The method includes preparing a precursor material of a formula $M_xMo_6Z_8$, wherein M is a metallic element, x is a number from 1 to 4 and Z is a chacogen with or without a presence of oxygen, and removing the metallic element from the precursor material to form a Chevrel-phase cathode material of a formula $Mo_6Z_8$.

Z can be selected from the group consisting of sulfur, selenium, tellurium and mixtures thereof.

In certain embodiments, preparing the precursor material includes combining stoichiometric amounts of MZ, $MoZ_2$ and molybdenum. Further, preparing the precursor material can include combining stoichiometric amounts of ammonium tetrathiomolybdate, anhydrous copper chloride and N,N dimethylformamide to form a mixture. Furthermore, preparing the precursor material can include heating the mixture to at least substantially complete reaction, filtering, precipitating, drying to yield a precursor material of a formula $M_2Mo_6Z_8$, removing $M_2$ ions, and drying to obtain the Chevrel-phase cathode material of $Mo_6Z_8$.

In other embodiments, preparing the precursor material can include combining stoichiometric amounts of copper (II) sulfide, molybdenum and molybdenum disulfide to form a mixture. Further, preparing the precursor material can include high energy mechanical milling the mixture to form a powder, heating the mechanically milled powder to at least substantially complete reaction, yielding a precursor material of a formula $M_2Mo_6Z_8$, removing $M_2$ ions; and drying to obtain the Chevrel-phase cathode material of a formula $Mo_6Z_8$ In another aspect, the invention provides a method of preparing an electrode.

In yet other embodiments, preparing the precursor material can include combining stoichiometric amounts of copper (II) selenide, molybdenum and molybdenum diselenide to form a mixture.

In another aspect, the invention provides an electrode. The electrode includes a slurry and a current collector, wherein the slurry is at least partially deposited onto the current collector to form a coating thereon. The slurry includes a Chevrel-phase cathode material of a formula $Mo_6Z_8$.

The current collector can be a material substrate selected from the group consisting of copper, graphite, nickel, platinum, quartz, gold, stainless steel, tantalum, titanium, silver and mixtures thereof. In certain embodiments, the current collector is graphite foil.

DETAILED DESCRIPTION OF PREFERRED EMBODIMENTS

The invention relates to Chevrel-phase materials, such as ternary molybdenum chalcogenide compounds. The Chevrel-phase materials, also referred to as Chevrel-phase compounds, in accordance with the invention have the formula $Mo_6Z_8$, wherein Mo represents molybdenum and Z represents a chalcogen. The invention further relates to electrochemical cells incorporating a cathode which includes a Chevrel-phase material, an anode which includes an alkali metal, and an electrolyte.

The Chevrel-phase materials of the formula $Mo_6Z_8$ can be prepared using various techniques and methods. In accordance with certain embodiments of the invention, the Chevrel-phase materials are derived from precursor materials. The precursor materials have the formula $M_xMo_6Z_8$, wherein M is a metallic element, x is a number, including but not limited to a integer, from 1 to 4, and Z is a chalcogen, e.g., chalcogenide.

The precursor materials of the formula $M_xMo_6Z_8$ can be formed using various methods. In accordance with certain embodiments of the invention, the precursor materials are formed by combining metal sulfides (MZ and $MoZ_2$) with molybdenum (Mo). Further, the metal sulfides (MZ and $MoZ_2$) and molybdenum (Mo) can be subjected to high energy mechanical milling (HEMM) in the process of forming the precursor materials.

In certain embodiments, the alkali metal is magnesium. Thus, the electrochemical cells in accordance with certain embodiments of the invention include a magnesium or magnesium-containing anode.

It is contemplated and understood that M can include a wide variety of metallic elements that are known to one having ordinary skill in the art. In certain embodiments, the metallic element can be selected from Li, Na, Mg, Ca, Sc, Cr, Mn, Fe Co, Ni, Cu, Zn, Sr, Y, Pd, Ag, Cd, In, Sn, Ba, La, Pb, Ce, Pr, Nd, Sm, Eu, Gd, Tb, Dy, Ho, Er, Tm, Yb, Lu and mixtures thereof.

The chalcogen Z may be selected from those known to one having ordinary skill in the art. In certain embodiments, the chalcogen Z can be selected from the chemical elements in Group 16 of the Periodic Table, including sulfur, selenium, tellurium and mixtures thereof. Further, in certain embodiments, Z is sulfur, selenium, tellurium or a mixture thereof, with or without the presence of oxygen. Typically, the oxygen when present is in a small or trace amount.

In accordance with certain embodiments of the precursor approach for use in preparing Chevrel-phase materials, stoichiometric amounts of MZ, $MoZ_2$ and Mo are combined to form a mixture. The mixture is heated to complete reaction or at least substantially complete reaction. The heating can be accomplished by various conventional mechanisms known in the art. For example, heating can be conducted over a hot plate at a temperature of about 90° C. under nitrogen bubbling. Following heating, the mixture is filtered using conventional techniques known in the art. Tetrahydrofuran (or any other known suitable material) is added to the filtrate to incipient precipitation. The resulting precipitate is washed in accordance with known techniques, e.g., with tetrahydrofuran and alcohol, e.g., methanol, and then dried using known techniques, e.g., at a temperature of about 60° C.

In certain embodiments, the dried product is ground and heated in an argon (or the like) atmosphere at about 1000° C. to yield metallic Chevrel-phase precursor material, e.g., $M_2Mo_6Z_8$.

The metal, e.g., metallic ions, are leached out using conventional mechanisms. For example, the metallic ions can be removed under an ambient atmosphere using a solution of $HCl/O_2$ bubbling. The solution is then centrifuged, washed and dried using known methods and techniques to yield the final Chevrel-phase product, e.g., $Mo_6Z_8$.

In certain embodiments, the starting materials for use in forming the precursor material can be subjected to high energy mechanical milling (HEMM). Accordingly, appropriate amounts of MZ, $MoZ_2$ and Mo are charged into a HEMM apparatus. The HEMM is carried out for a period of time which can vary. The time period can be as short in duration as thirty minutes or as long as one or two or three hours or more. The HEMM is followed by annealing at an elevated temperature under argon atmosphere. The temperature can vary and may be from about 1123 to about 1273K.

An advantage of employing HEMM is that no vacuum or silica ampoule is required for the synthesis due to complete absence of elemental sulfur/selenium from the starting composition. Further, there is no loss or gain in mass between the Chevrel-phase product and the precursor reactants. The ternary Chevrel phase can be formed directly from the ball-milled powder upon annealing. In certain embodiments, the annealing is carried out a temperature that is about 1073 K or greater in a corundum crucible in a tubular furnace.

In certain embodiments, M is copper, x is 2 and Z is sulfur. The precursor material is $Cu_2Mo_6S_8$ which is formed by the combination of CuS, $MoS_2$ and Mo. The Chevrel-phase material has the formula of $Mo_6S_8$ and is derived from the precursor material $Cu_2Mo_6S_8$ by removing the copper or copper ions therefrom. Suitable materials for use in forming the precursor material can include a mixture of stoichiometric amounts of ammonium tetrathiomolybdate and anhydrous copper chloride ($CuCl_2$) in the presence of anhydrous N,N-dimethylformamide. For example, formation of the Chevrel-phase material can be conducted according to the formula: $2CuS+3Mo+3MoS_2=Cu_2Mo_6S_8$. For ease of description, much of the disclosure is directed to the chalcogen being sulfur (i.e., Z represents S) and the metallic element is copper (i.e., M represents Cu). However, it is understood that in accordance with the invention, the chalcogen is not limited to sulfur and the metallic element is not limited to copper.

In general, the precursor approach includes preparing a precursor material which includes a metallic element and the metallic element (or ions thereof) is subsequently removed (e.g., leached out) to produce the Chevrel-phase product for use as cathode material.

The Chevrel-phase material synthesized in accordance with the above-described precursor approach can be employed to prepare an electrode, i.e., cathode, using conventional techniques and apparatus. For example, an electrode slurry containing the Chevrel-phase material of the invention can be prepared and deposited on a current collector, and then dried. The current collector can include a wide variety of suitable materials known by one having ordinary skill in the art. Non-limiting examples include but are not limited to copper, graphite, nickel, platinum, quartz, gold, stainless steel, tantalum, titanium, silver, and mixtures thereof. In certain embodiments, the current collector is graphite foil. Deposition of the slurry can include forming a coating, e.g., thin film, on the current collector. Drying can be accomplished using conventional mechanisms such as drying in a vacuum oven.

The Chevrel-phase cathode material can be combined with an alkali-metal anode, e.g., a magnesium or magnesium-containing anode, and an electrolyte to form an electrochemical cell, such as a magnesium ion rechargeable battery.

The electrolyte can be in the form of a solution. The electrolyte solution can include electrolyte and solvent.

In general, suitable electrolytes with high anodic/oxidative stability above 3V wherein magnesium can be deposited reversibly are not widely known and available in the art. It has been found that magnesium may not be reversibly deposited from solutions of simple magnesium salts, e.g., $Mg(ClO_4)_2$, in conventional organic solvents, e.g., acetonitrile, propylene carbonate or N,N-dimethylformamide. This is primarily due to the formation of a dense passivating surface/blocking layer on the electrode surface by the reduction products. It is believed that bare magnesium metal reacts with anions such as $ClO_4^-$, $BF_4^-$ to form insoluble magnesium salts/halides that block the magnesium electrodes. Moreover, the surface films effectively block the electrodes, as the mobility of the $Mg^{2+}$ ions through the impervious passivating films is low. After a period of time, the capacity fades leading to failure of the electrochemical cell.

It is generally known that magnesium can be deposited using Grignard reagents in ethereal solvents. Magnesium can be electro-deposited reversibly primarily based on the solutions of tetrahydrofuran (THF) using Grignard reagents (R—MgX, R=alkyl; X=Br, Cl), and amidomagnesium halides. However, due to the strong reducing character of Grignard reagents, and limited oxidative stability (EtMgBr and BuMgCl have an oxidative stability ~1.5V vs. Mg), it appears incompatible for cathodes to be developed for use in batteries. Also, it is known to use tetrahydrofuran (THF) or primary amines (N-methylaniline) as electrolytes in which both magnesium dissolution and deposition will occur. However, the Coulombic efficiency is typically low. In accordance with the invention, amidomagnesium halide-based Grignard reagent of the formula [3-[bis(trimethylsilyl)amino]phenylmagnesium chloride [$(CH_3)_3Si]_2NC_6H_4MgCl$] solution in 1.0 M THF is a suitable salt for synthesis of magnesium battery electrolyte. Due to the presence of an aromatic ring coupled with an amino methylsilyl group with $MgCl^+$ ion, and electron lone pair donated to the aryl phenyl group, the R—Mg bond is strong and likely precludes or prevents oxidation of the anionic species.

In certain embodiments of the invention, the electrolyte solution includes amidomagnesium-based magnesium salt transmetallated with an aluminum salt electrolyte dissolved in solvent. In other embodiments, the electrolyte solution includes phenyl magnesium chloride-aluminum chloride, amidomagnesium-based magnesium salt transmetallated with an aluminum salt electrolyte, and solvent. The solvent can be tetrahydrofuran. In yet other embodiments, the electrolyte solution includes 3-bis(trimethylsilyl)aminophenylmagnesium chloride with aluminum chloride in tetrahydrofuran.

The cathodes, electrodes and electrochemical cells prepared in accordance with the invention demonstrate benefits and advantages over those that are known in the art. For example, the electrochemical performance, e.g., rate capability and stable specific capacity, of the products prepared according to the invention are found to be superior to known products. The Chevrel-phase material prepared in accordance with the invention exhibits very high rate capability and cycle performance when assembled in a magnesium cell.

EXAMPLES

Example I

Materials Preparation $Cu_2Mo_6S_8$(CuCP) was synthesized as follows. In a 3-neck round bottom flask, stoichiometric amounts of ammonium tetrathiomolybdate (4 g, 15.37 mmol; Alfa-Aesar 99.95%) and anhydrous copper(II) chloride (0.6890 g, 5.12 mmol, Alfa-Aesar 99.985%) were added to N,N dimethylformamide, DMF (130 ml) solution. The resultant mixture was heated over a hot plate (~90° C.) for 6 hours under constant $N_2$ bubbling. After complete reaction, the mixture turned deep red in color and was filtered. Tetrahydrofuran (1:5 by volume) was added immediately to the filtrate to incipient precipitation. A fine black precipitate was formed. This precipitate was kept overnight. Then, the precipitate was washed with tetrahydrofuran and methanol followed by drying at ~60° C. for 24 hours. The final dried solid product was ground and heated in a UHP Ar+6.5% $H_2$ atmosphere at ~1000° C. for 5 hours which directly yielded copper Chevrel phase $Cu_2Mo_6S_8$. The copper ions were leached out under an ambient atmosphere using a solution of 6 M $HCl/O_2$ bubbling for 8 hours according to the method outlined by Lancry, et al. ("Leaching Chemistry and the Performance of the $Mo_6S_8$ Cathodes in Rechargeable Mg Batteries, Chemistry of Materials", 16 (2004) 2832-2838). Following complete copper leaching, the solution was centrifuged, washed with the same solvent and dried in an oven at ~60° C. In order to perform qualitative phase analysis, Z-ray diffraction (XRD) was carried out using the Philips PW1830 system employing the $CuK_\alpha$ ($\lambda$=0.15406 nm) radiation. Microstructural analysis of the initial $Cu_2Mo_6S_8$ and $Mo_6S_8$ obtained after copper removal was performed using a scanning electron microscopy (JSM-6610, JEOL) operating at 10 kV.

Electrochemical Characterization

An electrode slurry was prepared by mixing 80 wt. % of the $Mo_6S_8$ powder (-325 mesh), 10 wt. % Super P, 10 wt. % polyvinylidene fluoride (PVDF) dissolved into a solution of N-methylpyrrolidinone (NMP) to make a homogeneous solution. The slurry was coated onto a graphite foil and dried at ~110° C. in a vacuum oven. Electrochemical characterization was conducted at room temperature with 2016 coin cells assembled inside an argon-filled MBraun Inc. glove box (<0.1 ppm each of $O_2$ and $H_2O$) employing magnesium foil as a counter electrode and cellgard separator soaked in an electrolyte solution of 0.4 molar 2(PhMgCl)—$AlCl_3$ in tetrahydrofuran. Cyclic voltammogram (CV) was performed using an electrochemical workstation (VersaSTAT 3, Princeton Applied Research) between 0.5-1.75 V at a constant sweep rate of ~0.01 mVs$^{-1}$. Galvanostatic charge-discharge cycles were carried out employing various current rates of ~20-120 mA/g within 0.5-1.5 V, with a short rest period between the charge/discharge cycles using a multichannel battery testing system (Arbin BT2000 instrument).

Results

The XRD patterns of the heat-treated powder obtained by the precursor route shows characteristic XRD peaks. The major diffraction peaks were indexed to the rhombohedral phase of $Cu_2Mo_6S_8$ (space group: R-3; number: 148; JCPDS-ICDD: 00-047-1519). Similarly, the XRD pattern of the powder obtained after acid removal of copper ions matches with the rhombohedral $Mo_6S_8$ (space group: R-3; number: 148; JCPDS number: 00-027-0319). The exact match of the XRD patterns of pristine $Cu_2Mo_6S_8$ and acid leached $Mo_6S_8$ phase compared with the standard XRD pattern suggests that the precursor route is a simple and convenient approach to the direct synthesis of Chevrel phase compounds. An impurity phase of $MoS_2$ (space group: P63/mmc, number: 194, JCPDS number: 01-073 1508) was observed in both $Cu_2Mo_6S_8$ and $Mo_6S_8$ identified by the presence of peaks at 2θ=14.4°, 32.8°, and 39.6°. The SEM micrographs of the $Cu_2Mo_6S_8$ and $Mo_6S_8$ powder materials showed that distinct micrometer-size cuboidal shape crystallites (~0.5-2 μm) were formed. The crystallites were relatively smaller for the $Mo_6S_8$ as compared to the $Cu_2Mo_6S_8$ phase.

Cyclic voltammogram at a scan rate ~0.01 $mVs^{-1}$ has been recorded between 0.5-1.75 V of the electrode (comprising 80% $Mo_6S_8$, 10% PVDF, 10% Super-P) in a 0.4 M $THF/2(PhMgCl)—AlCl_3$ electrolyte solution. The CV curve indicates a highly reversible behavior for magnesium-ion insertion/extraction in the $Mo_6S_8$ phase similar to the expected electrochemical phenomena based on observations in the art. The anodic and cathodic peaks observed at ~1.05 V and 1.17 V respectively, suggest $Mg^{2+}$ insertion/extraction into the $Mg_xMo_6S_8$ (0<x<2) phase. It is established that $Mg^{2+}$ insertion into $Mo_6S_8$ occurs in two stages, but due to partial charge entrapment after initial magnesiation only 60-80% magnesium-ion can be extracted during the first charge, resulting in 20-25% capacity loss compared to the theoretical value (128 $mAhg^{-1}$). The loss in capacity may be salvaged if the electrochemical cell can be operated at an elevated temperature (~60-80° C.). The galvanostatic charge-discharge profiles ($1^{st}$, $2^{nd}$ $25^{th}$ and $50^{th}$ cycle) of the $Mo_6S_8$ electrode performed at a constant current rate of ~20 $mAg^{-1}$ (~C/6). During first discharge, electrochemical $Mg^{2+}$ insertion occurred into $Mo_6S_8$ host, and offered a specific discharge capacity of ~116 $mAhg^{-1}$ (91% of theoretical value). During the $1^{st}$ discharge curve, $Mg^{2+}$ insertion plateaus occurred at ~0.9 V, whereas $Mg^{2+}$ extraction occurred at ~1.2 V. The $2^{nd}$, $25^{th}$, and $50^{th}$ cycles indicated only single reaction plateau at ~1.1 V ($Mg^{2+}$ insertion) and at ~1.2 V ($Mg^{2+}$ extraction), respectively. The cycling data suggested that the initial $Mg^{2+}$ insertion into $Mo_6S_8$ was difficult and intrinsically very slow requiring a slight overvoltage of ~200 mV compared to the subsequent cycles. The $1^{st}$ cycle discharge (~116 $mAhg^{-1}$) and charge capacity (~104 $mAhg^{-1}$) suggested ~91% magnesiation and ~81% demagnesiation occurred from the $Mo_6S_8$ host (resulting in a $1^{st}$ cycle irreversible loss ~10.3%). Complete removal of $Mg^{2+}$ ion was not possible at room temperature due to the partial charge trapping in the $Mo_6S_8$ host. The variation of specific capacity vs. cycle number along with coulombic efficiency of the $Mo_6S_8$ electrode, cycled at a constant current of ~20 $mAg^{-1}$ (~C/6 rate) in the potential window of 0.5-1.5 V shows that the $1^{st}$ cycle discharge and charge capacity of the $Mo_6S_8$ electrode is ~116 $mAhg^{-1}$ and 104 $mAhg^{-1}$, respectively, with a $1^{st}$ cycle irreversible loss (FIR) of ~10.3%. However, from the $2^{nd}$ to $50^{th}$ it is shown that there was a steady charge and discharge capacity of ~80 $mAhg^{-1}$ and ~76 $mAhg^{-1}$ respectively, which resulted in an improved coulombic efficiency of ~95%. This excellent capacity retention may be ascribed to the formation of high surface area cuboidal shaped ~0.5-2 μm, $Mo_6S_8$ particles, which allowed suitable wetting of the active material with the electrolyte promoting good charge transfer. The differential capacity plot (dQ/dV vs. V) of the $1^{st}$, $2^{nd}$, $25^{th}$, and $50^{th}$ cycle shows that during the $1^{st}$ discharge and charge cycles, magnesiation/demagnesiation occurred at ~0.92 V and at ~1.17 V, respectively. A sharp peak is shown at ~1.10 V (magnesiation) and at ~1.17 V (demagnesiation) for the $2^{nd}$, $25^{th}$, and $50^{th}$ cycles which was due to the known phenomena of partial entrapment of $Mg^{2+}$ ion after $1^{st}$ magnesiation ($Mg_2Mo_6S_8$) which resulted in only one $Mg^{2+}$ ion cycling into/from the $Mg_xMo_6S_8$ (0<x≤1) host from the $2^{nd}$ cycle and thereon. The differential capacity plot matched well with the charge-discharge profile of the electrode cycled at 20 $mAg^{-1}$ which suggested excellent cyclability and reversibility of $Mg^{2+}$ insertion/extraction phenomena of the as-synthesized $Mo_6S_8$ electrode in an Mg cell.

The excellent electrochemical rate performance was validated. The $Mg/Mo_6S_8$ cell was cycled at various current rates. The results showed the rate capability of the $Mo_6S_8$ electrode performed at current rates of 20 $mAg^{-1}$ (~C/6), 64 $mAg^{-1}$ (~C/2), 128 $mAg^{-1}$ (~C), and 192 $mAg^{-1}$ (~1.5C). The capacity retention of the synthesized cuboidal $Mo_6S_8$ via the novel precursor approach was excellent compared to literature reports of similar Chevrel phase compounds synthesized by published approaches. The discharge capacities at the above current rate was ~76 $mAhg^{-1}$, ~72 $mAhg^{-1}$, ~68 $mAhg^{-1}$, and ~66 $mAhg^{-1}$ respectively. The coulombic efficiency at ~C/6, ~C/2, ~1C, and ~1.5 C rate was 95%, 97.8%, 98.9%, and 99.3%, respectively. Although it is expected that coulombic efficiency decreases with increasing C-rate, the unique features of cuboidal $Mo_6S_8$ (excellent electronic conductivity) rendered it suitable for fast insertion/extraction of $Mg^{2+}$ ions at ambient temperature with an improved coulombic efficiency in a Mg prototype cell.

Conclusion

In summary, unique cuboidal shape ~0.5-2 μm size $Cu_2Mo_6S_8/Mo_6S_8$ Chevrel phase was synthesized by a rapid and facile precursor route. XRD confirmed the phase formation and the electrochemical measurements indicated superior performance, such as rate capability and stable specific capacity. The $Mo_6S_8$ Chevrel phase exhibited extremely high rate capability and cycle performance when assembled in a Mg cell. The cell delivered a capacity of ~66 $mAhg^{-1}$ at ~1.5 C rate making it suitable as a cathode for a magnesium-ion battery.

Example II

Stoichiometric amounts of $MoS_2$, Mo, and CuS were batched in a SS vial (powder: ball ratio=1:10). The powders were mechanically milled for intervals of 1 hour, 2 hours and 3 hours, and subjected to XRD patterns. After 3 hours of milling, the powder was heat-treated at 1000° C./5 hours under UHP argon atmosphere. The X-ray diffraction patterns showed the synthesis of $Cu_2Mo_6S_8$ Chevrel-phase by the high energy mechanical milling route. The XRD patterns of the heat-treated powder also showed the formation of pure crystalline $Cu_2Mo_6S_8$. The $Cu_2Mo_6S_8$ was washed with $HCL/O_2$ bubbling for 7 hours to yield completely crystalline $Mo_6S_8$.

Example III

Stoichiometric amounts of MoSe$_2$, Mo, and CuSe were batched in a SS vial (powder: ball ratio=1:10). The powders were mechanically milled for intervals of 1 hour, 2 hours and 3 hours, and subjected to XRD patterns. After 3 hours of milling, the powder was heat-treated at 1000° C./5 hours under UHP argon atmosphere. The XRD analysis and patterns collected showed the synthesis of Cu$_2$Mo$_6$Se$_8$ Chevrel-phase by the high energy mechanical milling route. Further, the XRD patterns of the heat-treated powder showed the formation of pure crystalline Cu$_2$Mo$_6$Se$_8$. The Cu$_2$Mo$_6$Se$_8$ was washed with HCL/O$_2$ bubbling for 7 hours to yield completely crystalline Mo$_6$Se$_8$.

Example IV

Novel amidomagnesium-based electrolytes at varying molar ratios were compared with Aurbach's 1$^{st}$ and 2$^{nd}$ generation electrolytes by conducting cyclic voltammetry. The electrochemical parameters obtained from the cyclic voltammograms conducted at a 25 mvs$^{-1}$ scan rate using amidomagnesium-based novel electrolytes at different molar ratios are compared with Aurbach's 1$^{st}$ generation electrolyte (i.e., 0.25 molar Mg(AlCl$_2$EtBu)$_2$/THF) and 2$^{nd}$ generation electrolyte (i.e., 0.4 molarPhMgCl)—AlCl$_3$/THF) are shown in Table 1.

TABLE 1

Electrochemical parameters obtained from the cyclic voltammograms conducted at 25 mVs$^{-1}$ scan rate using novel amidomagnesium based electrolytes at different molar ratio and compared with Aurbach's 1$^{st}$ and 2$^{nd}$ generation electrolyte.

| base/acid ratio | Onset deposition potential (V) | Anodic stripping peak potential (V) | Mg cycling efficiency (%) |
|---|---|---|---|
| 1:1 | −0.283 | 0.983 | 93.2 |
| 2:1 | −0.242 | 0.842 | 63.7 |
| 3:1 | −0.351 | 0.401 | 56.5 |
| 1:2 (1$^{st}$ generation) | −0.193 | 1.032 | 95 |
| 2:1 (2$^{nd}$ generation) | −0.37 | 0.643 | 85.5 |

The 1:1 (Lewis base:Lewis acid ratio) electrolyte conducted at a scan rate of 25 mVs$^{-1}$ demonstrated enhanced performance for all of the novel electrolytes in accordance with the invention. Further, Table 1 suggests that the coulombic efficiency for reversible magnesium deposition/dissolution was near or about 93% for the 1:1 electrolyte. The coulombic efficiency for the 2:1 and 3:1 electrolytes was about 64% and about 56%, respectively.

The linear sweep voltammograms obtained at a scan rate of 1 mVs−1 from open circuit potential to approximately 4 V showing the anodic stability onto Pt working electrode of the novel amidomagnesium-based electrolytes at varying molar ratios as compared with Aurbach's 1$^{st}$ and 2$^{nd}$ generation electrolyte. The linear sweep voltammograms of the above-mentioned electrolytes from open circuit potential to about 4 V at 1 mVs$^{-1}$ showed that the electrochemical stability of the amidomagnesium-based novel electrolytes of 1:1, 2:1 and 3:1 was about 2.27, about 2.33 and about 2.19 V, respectively, onto noble metal (e.g., platinum electrode). The electrochemical stability of the novel electrolyte was similar to Aurbach's 1$^{st}$ generation electrolyte but significantly lower than Aurbach's 2$^{nd}$ generation electrolyte.

Example V

A Mo$_6$S$_8$ cathode was tested in a 2016 coin cell using 0.4 M 3((3-bis(trimethylsilyl)amino)phenylmagnesium chloride)-AlCl$_3$THF (3:1 novel electrolyte). The electrochemical performance in particular when conducted at a current rate of 20 mAg$^{-1}$ and cyclic voltammetry employing a scan rate of 100 microvolts per second (100 µVs$^{-1}$) showed a 1$^{st}$ cycle irreversible loss of about 40% and stable discharge capacity about 37 mAhg$^{-1}$ at C/6 rate with coulombic efficiency about 90%.

Example VI

A Mo$_6$S$_8$ cathode was tested in a 2016 coin cell using 0.4 M 2((3-bis(trimethylsilyl)amino)phenylmagnesium chloride)-AlCl$_3$THF (2:1 novel electrolyte). The electrochemical performance in particular when conducted at a constant current of 20 mAg$^{-1}$ and a scan rate of 100 microvolts per second (100 µVs$^{-1}$) showed a 1$^{st}$ cycle irreversible loss of about 48% and stable discharge capacity about 54 mAhg$^{-1}$ at C/6 rate with coulombic efficiency about 88%.

Example VII

A Mo$_6$S$_8$ cathode was tested in a 2016 coin cell using 0.4 M ((3-bis(trimethylsilyl)amino)phenylmagnesium chloride)-AlCl$_3$THF (1:1 novel electrolyte). The electrochemical performance in particular when cycled at a constant current of 20 mAg$^{-1}$ and a scan rate of 100 microvolts per second (100 µVs$^{-1}$) showed a 1$^{st}$ cycle irreversible loss of about 26% and stable discharge capacity about 60 mAhg$^{-1}$ at C/6 rate with coulombic efficiency about 99%.

Example VIII

Cu$_2$Mo$_6$S$_8$ (Cu$_2$CP) Chevrel phase was developed by High Energy Mechanical Milling (HEMM) route. Stoichiometric amounts of MoS$_2$, Mo, and CuS were batched in a SS vial (powder: ball ratio=1:10). The powders were mechanically milled for 1 hour, 2 hour, and 3 hour intervals and subjected for XRD patterns. After 3 hours of milling, the powder was heat-treated at 1000° C./5 h under UHP Ar atm. XRD pattern of the heat-treated powder showed the formation of pure crystalline Cu$_2$Mo$_6$S$_8$. Further, Cu$_2$Mo$_6$S$_8$ was washed with HCl/O$_2$ bubbling for 7 hours yields completely crystalline Mo$_6$S$_8$ (CP).

It was established that Mg$^{2+}$ insertion into Mo$_6$S$_8$ Chevrel phase occurred in two stages, and theoretically could offer a capacity ~128 mAhg$^{-1}$. However, due to partial charge entrapment after initial magnesiation, only 50-60% magnesium-ion could be extracted during first charge, resulting in 40-50% irreversible loss in the 1$^{st}$ cycle from the theoretical value (~128 mAhg$^{-1}$). In order to minimize the 1$^{st}$ cycle irreversible loss, Cu was partially leached from the original Cu$_2$CP structure. 1.8 g of Cu$_2$CP was added in 20 ml 6M HCl solution in a small glass vial with a magnetic stir bar. Cu2CP/HCl solution was continuously stirred for 2 days at room temperature. After 2 days of continuous stirring, the solution was ultrasonically cleaned using distilled water (3 times) and dried at a temperature of 60° C. for 24 hours. XRD pattern of the partial leached Cu$_2$CP showed the formation of completely crystalline CuMo$_6$S$_8$ (CuCP).

Results

The XRD patterns were collected on Cu$_2$Mo$_6$S$_8$ (Cu$_2$CP) powder obtained by high energy mechanical milling of CuS, MoS$_2$ and Mo stoichiometric compositions followed by heat treatment at 1000° C./5 h under UHP Ar, and acid leached $CuMo_6S_8$ (CuCP) obtained after 2 days partial leaching of copper using 6M HCl solution. The Bragg diffraction lines were indexed to a hexagonal-rhombohedral symmetry unit cell of $Cu_2Mo_6S_8$ (space group: R-3; number: 148; JCPDS-ICDD: 00-047-1519). Lattice parameter(s) calculated using least-square method of the experimental data (a=0.96478 nm, c=1.02026 nm, and unit cell volume=822.42×10$^{-3}$ nm$^3$) was in good agreement with the standard $Cu_2Mo_6S_8$ unit cell parameters (a=0.9584 nm, c=1.025 nm, unit cell volume=815.36×10$^{-3}$ nm$^3$). Similarly, the XRD pattern obtained after removal of one copper from the heat-treated powder using hydrochloric acid treatment matched with the JCPDS patterns. The Braggs lines were indexed with the hexagonal-rhombohedral symmetry unit cell of $CuMo_6S_8$ phase (space group: R-3; number: 148; JCPDS-ICDD: 00-034-1379), and the calculated lattice parameter(s) (a=0.94412 nm, c=1.04761 nm, and unit cell volume=808.70×10$^{-3}$ nm$^3$) matched quite well with standard unit cell parameters of $CuMo_6S_8$ obtained from above ICDD database (a=0.94120 nm, c=1.04070 nm, unit cell volume=798.40×10$^{-3}$ nm$^3$). The calculated lattice parameters values were consistent with the standard lattice parameter(s) values of pristine $Cu_2Mo_6S_8$ and acid leach $CuMo_6S_8$ powder obtained from JCPDS-ICDD database suggested that 6M HCl treatment for 2 days leached 50% copper from the original $Cu_2CP$ structure and yielded $CuMo_6S_8$ (CuCP).

The variation of specific capacity versus cycle number along with coulombic efficiency of the $CuMo_6S_8$ electrode, cycled at a constant current of ~20 mAg$^{-1}$ (~C/6 rate) in the potential window of 0.5-1.5 V using 0.4 molar 2(PhMgCl—AlCl$_3$)/tetrahydrofuran electrolyte showed that the 1$^{st}$ cycle discharge and charge capacity of the $CuMo_6S_8$ electrode was ~105 mAhg$^{-1}$ and ~78 mAhg$^{-1}$, respectively, with a 1$^{st}$ cycle irreversible loss of ~25.7% (or coulombic efficiency of ~74.3%). It is to be noted that, 1st cycle irreversible loss of $Mo_6S_8$ ~50% obtained by complete copper leaching out of HEMM derived $Cu_2CP$ structures. Further, from 10$^{th}$ cycles onward there was a steady charge-discharge capacity of ~55 mAhg$^{-1}$, with a coulombic efficiency of ~99.9%. The preliminary results of CuCP suggested that partial Mg$^{2+}$ charge entrapment which is common during 1$^{st}$ cycle magnesiation (discharge) in $Mo_6S_8$ cathode may be overcome with $CuMo_6S_8$ structure where one Mg$^{2+}$ can cycle without any hindrance.

HEMM derived $Mo_6Se_8$ cathode assembled in a 2016 coin cell using Mg metal anode, 0.4 molar 2(PhMgCl)—AlCl$_3$/tetrahydrofuran electrolyte which exhibited a ~17% capacity fade after 100 cycles. The exact reason of fading is still under investigation. However, in order to improve the electrical conductivity of the $Mo_6Se_8$ cathode, it was mixed with conductive graphite and coated with Mg$^{2+}$ conducting MgSO$_4$ and used as composite cathode.

Example IX $Cu_2Mo_6Se_8$ (Cu$_2$CP) Chevrel phase developed by 3 hours of High Energy Mechanical Milling (HEMM) of stoichiometric amounts of MoSe$_2$, Mo, and CuSe was followed by heat-treatment at 1000° C./5 h under UHP Ar atm, were further mixed with commercial available synthetic graphite (SigmaAldrich, 1-2 m) in situ during milling process at 70:30 ratio (weight percent) and used as composite cathode for magnesium battery. Further, $Cu_2Mo_6Se_8$/graphite was washed with HCl/O$_2$ for 7 hours to develop $Mo_6Se_8$/graphite composite cathode.

Example X $Mo_6Se_8$ Chevrel-phase obtained after removal of copper from HEMM derived $Cu_2Mo_6Se_8$ was mixed thoroughly with previously prepared water solution of commercially available MgSO$_4$ (Aldrich, 99.9%) at 70:30 ratio (weight percent). Further the mixed slurry was dried at 60° C. for 24 hours and used as MgSO$_4$ coated $Mo_6Se_8$ cathode for magnesium battery.

Example XI

Electrochemical impedance spectroscopy (EIS) was carried out on a $Mo_6S_8$ electrode before and after cycling to evaluate Mg$^{2+}$-ion charge storage mechanisms. EIS was performed using a Versastat 3 (Princeton Applied Research Inc.) potentiostat over a frequency range of 0.01 Hz-100 KHz. An A.C. amplitude of 5 mV was used and the spectra were obtained before cycling and subsequent to 1$^{st}$ and 2$^{nd}$ discharge cycle. Electrode potential was stabilized after discharge cycle and EIS was performed (i.e., immediately such that no significant relaxation processes and equilibrium phase changes occurred) to observe any noticeable changes in the charge storage mechanism upon cycling. The effect of cycling on charge transfer parameters was also analyzed by performing EIS. Z-View (Scribner Associates, Inc.; version 3.3) software was used for Randall's equivalent circuit modeling of the experimentally collected impedance spectra.

Results

Electrochemical impedance study (EIS) was performed on a newly prepared $Mo_6S_8$ electrode (wet chemical route) as well as cycled $Mo_6S_8$ electrode at the magnesiated (discharged) and de-magnesiated (charged) states assembled in a 2016 coin cell using magnesium foil as the counter and reference electrodes, $Mo_6S_8$ composite electrode as the working electrode and 0.4 molar 2(PhMgCl)—AlCl$_3$ in tetrahydrofuran as the electrolyte. A Nyquist plot was generated for the electrode prepared using the Chevrel phase ($Mo_6S_8$) at different stages. A clear transition in behavior was observed upon cycling. The impedance behavior was modeled using a Randall's circuit which considered a number of electrochemical phenomena including:

a) High frequency series resistance ($R_s$);
b) High frequency semi-circle (HFS) due to sluggish charge and electron transfer kinetics (CPE$_e$ and R$_e$);
c) Gerischer impedance as a result of the coupling of a chemical and an electrochemical process (GE);
d) Low frequency semi-circle (LFS) due to Mg-ion trapping in the Chevrel phase ($Mo_6S_8$) host (CPE$_i$ and R$_i$); and
e) Diffusion characteristic and associated ion-trapping (W$_o$, R$_{trap}$, CPE$_{trap}$).

A model including all of these elements can be used for circuit modeling. The model employed considered both charge transfer and mass transfer phenomena contributing to the electrode impedance. The circuit also included constant phase elements (CPEs) due to the porous nature of the electrodes. In addition, it was found that the Gerischer impedance element (GE) was very small and insignificant for the electrode.

With respect to the effect of insertion/extraction on the impedance profile of the electrode materials, it was observed that the material exhibited a significant increase in overall impedance following the initial Mg$^{2+}$-ion insertion after the 1$^{st}$ discharge cycle. Table 3 depicts the values of resistances obtained as a result of Randall's circuit modeling. The solution resistance ($R_s$) was almost invariable. The charge transfer resistance ($R_e$) which is a characteristic of electron and ion transfer differed, pre- and post-$Mg^{2+}$-ion insertion stage. There was a drop in $R_e$ post $1^{st}$ discharge and an increase from subsequent to $2^{nd}$ discharge. Interfacial resistance increased post $1^{st}$ discharge and decreased subsequent to $2^{nd}$ discharge. Charge trapping ($R_{trap}$) which remained very small before cycling and post $1^{st}$ discharge, increased by almost 8 orders, post $2^{nd}$ discharge. The transition in these three parameters provided information with respect to the $Mg^{2+}$ charge storage mechanisms occurring in the Chevrel phase. The significant increase in overall impedance subsequent to first discharge indicated that the $Mg^{2+}$-ion insertion was accompanied by a rate limiting phenomenon. This, in turn, was seen by the two order rise in interfacial resistance ($R_i$) subsequent to $1^{st}$ discharge. The electrode resistance, however, maintained the same order indicating that post-insertion in the $1^{st}$ discharge cycle, the electrode became kinetically limiting for electrochemical charge transfer processes as a result of the formation of either a secondary interface or a phase change. After the $2^{nd}$ discharge, however, the $R_i$ was small but $R_{trap}$ and $R_e$ increased indicating that part of the layer was either inactive or became a barrier to solid state diffusion of $Mg^{2+}$. Without intending to be bound by any particular theory, this mass transfer limitation and loss in magnesium trapped irreversibly as a result of the phase change occurring in the $1^{st}$ discharge cycle, was believed to be the reason for the low capacity occurring from the $2^{nd}$ cycle onward.

high energy mechanical milling route able to deliver a first cycle discharge capacity ~120-128 mAhg$^{-1}$ demonstrate the feasibility of the system as potential 2V magnesium battery electrolyte.

1 molar [$(CH_3)_3Si]_2NC_6H_4MgCl$] salt in THF solution was transmetallated with 1 molar $AlCl_3$/THF in-house solution at three different Lewis base-acid molar ratio of 1:1, 2:1 and 3:1 and studied the electrochemical behavior using cyclic voltammetry, chronopotentiometry, linear sweep voltammetry, and galvanostatic charge-discharge cycles. Electrochemical data shows that amiodomagnesium-based electrolyte is electrochemically stable up to 2.3V and capable of delivering 100% theoretical capacity (~128 mAhg$^{-1}$) from $Mo_6S_8$ Chevrel phase cathode at room temperature.

Experimental Section

Synthesis of 0.4 Molar L$^{-1}$ [$(CH_3)_3Si]_2NC_6H_4MgCl$]—$AlCl_3$/THF Electrolyte The starting chemical of [(CH3)3Si]2NC6H4MgCl] (1 molar in tetrahydrofuran) was purchased from Sigma Aldrich and used without further purification. Highly pure inhibitor-free anhydrous tetrahydrofuran (THF) was obtained from EMD Millipore and further dried (using Na chips and benzophenone) under ultra high purity Argon atmosphere using stringent drying steps outlined in the literature. Anhydrous $AlCl_3$ (99.999%) powder in glass ampoules was obtained from Sigma Aldrich and used as-received. First, 1 molar $AlCl_3$/THF was prepared where ~2 g $AlCl_3$ was gradually added in an anhydrous THF (~15 ml) through a powder addition funnel inside a Schlenk flask

TABLE 3

Charge transfer parameter(s) of the Chevrel phase electrode at different stages obtained from Randall circuit model.

| | $R_s$ | $CPE_e$-T | $CPE_e$-P | $R_e$ | $CPE_i$-T | $CPE_i$-P | $R_i$ | GE-T |
|---|---|---|---|---|---|---|---|---|
| Before cycling | 10.27 | 8.03E−06 | 0.974 | 286.4 | 8.49E−06 | 1.009 | 53.28 | 0.693 |
| After $1^{st}$ discharge | 12.36 | 4.88E−06 | 0.941 | 182.6 | 7.23E−05 | 0.821 | 9748 | 5.195 |
| After $2^{nd}$ discharge | 12.94 | 4.29E−05 | 0.76 | 921.2 | 1.14E−05 | 0.881 | 65.09 | 3.849 |

| | GE-P | $W_o$-R | $W_o$-T | $W_o$-P | $R_{trap}$ | $CPE_{trap}$-T | $CPE_{trap}$-P |
|---|---|---|---|---|---|---|---|
| Before cycling | 0.134 | 5.041 | 4.22E−06 | 0.393 | 2.32E−04 | 1.318E−04 | 0.125 |
| After $1^{st}$ discharge | 0.089 | 0.205 | 1.61E−07 | 0.416 | 3.01E−05 | 1.287E−04 | 0.294 |
| After $2^{nd}$ discharge | 0.728 | 0.135 | 1.08E−07 | 0.375 | 8855 | 5.813E−04 | 0.479 |

Example XII

The electrochemical behavior and stability of amidomagnesium-based three non-aqueous electrolyte 0.4 molar [$(CH_3)_3Si]_2NC_6H_4MgCl$]—$AlCl_3$/THF were investigated using both a three-electrode electrochemical cell and coin cells. The cyclic voltammetry, linear sweep voltammetry, and coin cell charge/discharge measurements indicated that the electrolyte is capable of reversibly cycling magnesium with a Coulombic efficiency ~90% and electrochemical stability ~2.3V. Reversible cycling of magnesium from the amidomagnesium-based electrolytes were proved by scanning electron microscopy (SEM), and energy-dispersive X-ray spectroscopy (EDX) analyses. SEM and EDX show that uniform spherical magnesium particles (1-5 μm) free from any dendrites formation deposited on platinum substrate. Moreover, $Mo_6S_8$ cathode derived by molten salt and under constant stirring. The above reaction is exothermic and a light yellowish solution was obtained after the reaction was over. The electrolyte of chemical formula 0.4 molar L$^{-1}$ [$(CH_3)_3Si]_2NC_6H_4MgCl$]—$AlCl_3$/THF at different molar ratio was synthesized according to the following method. Stoichiometric amounts of [$(CH_3)_3Si]_2NC_6H_4MgCl$] (1 molar in THF) and $AlCl_3$ (1 molar in THF) (1:1, 2:1, and 3:1 Lewis base/Lewis acid ratio in volume) were added in a 25 ml clear glass vial. The mixture was continuously stirred for ~2 h inside the glass vial closed with a screw threaded cap. After 2 h reaction, the screw cap was carefully opened and the electrolyte solution was diluted using anhydrous tetrahydrofuran (THF), resulting in the formation of 0.4 molar L$^{-1}$[$(CH_3)_3Si]_2NC_6H_4MgCl$]—$AlCl_3$/THF electrolyte. The electrolyte preparation was carried out inside an MBraun Inc. glove box where the oxygen and moisture levels are always maintained <0.1 ppm. 0.25 molar L$^{-1}$ Mg(AlCl$_2$EtAu)$_2$/THF (butyl-ethyl complex or BEC) as well as 0.4 molar L$^{-1}$ 2(PhMgCl)—AlCl$_3$/THF (all-phenyl complex or APC) were also synthesized as reference electrolytes according to the standard protocol outlined in literature.

Characterization

Electrochemical analyses, including linear sweep voltammetry (LSV) and cyclic voltammetry (CV) were carried out on a CHI660D electrochemical station. The electrochemical cell used in the LSV and CV study was a three electrode cell which consisted of a working electrode (Pt), counter electrode (Mg), and reference electrode (Mg). The scan speed of the test was set to 10, 25, and 50 mV/s within −1V to +2.2V potential ranges. Deposition/dissolution efficiency of Mg on to Pt electrode was carried out in 2016 coin cells at a constant current density of 0.25 mAcm$^{-2}$ for 1 hour deposition and −0.25 mAcm$^{-2}$ for 1 hour dissolution for chronopotentiometic measurements. The three electrode cells were assembled with the Pt working electrode, woven fiberglass (GFD separator), Mg counter and reference electrode, and 0.4 M L$^{-1}$ [(CH$_3$)$_3$Si]$_2$NC$_6$H$_4$MgCl]—AlCl$_3$/THF electrolyte.

Scanning electron microscopy (SEM) and energy-dispersive X-ray spectroscopy (EDX) were performed using a Philips XL-30 operating at an accelerating voltage of 20 kV. It is noted that the electrodes were washed by copious amount of THF three times and dried in vacuum before SEM and EDX analysis. The conductivity of the synthesized electrolyte was measured by a portable conductivity meter (HI991301, HANNA).

Results and Discussions

Amidomagnesium halide-based Grignard reagent of the formula [3-[bis(trimethylsilyl)amino] phenylmagnesium chloride [(CH$_3$)$_3$Si]$_2$NC$_6$H$_4$MgCl] solution in 1.0 THF was identified as a potential salt for the synthesis of ma magnsium battery electrolyte. The chronopotentiogram of the 1$^{st}$ cycle plating and stripping on platinum substrate using 1 mol L$^{-1}$ [(CH$_3$)$_3$Si]$_2$NC$_6$H$_4$MgCl]/THF solutions demonstrated the expected reversibility of Mg$^{2+}$. Metallic magnesium was reversibly plated onto platinum and stripped versus Mg$^{2+}$/Mg couple in a three electrode cell at a constant current rate of ~0.1 mA/cm$^2$ for 1 h. It was observed that the overpotential for magnesium plating (−0.123V versus Mg$^{2+}$/Mg) and stripping (0.103V versus Mg/Mg$^{2+}$) was low and Coulombic efficiency ~75% was observed suggest that the [(CH$_3$)$_3$Si]$_2$NC$_6$H$_4$MgCl]/THF Grignard reagent based solvent is capable of cycling Mg-ion in a reversible manner. Cyclic voltammetry study of this amiodomagnesium-based solvent using platinum as working electrode and magnesium being counter and reference electrode in a three electrode cell further prove our hypothesis. The cell was first run from open circuit potential to −1V (for Mg deposition) followed by −1V to 2.2V (for Mg stripping) using different voltage scan rate. The cyclic voltammogram at different scan rates (10, 25 and 50 mV/s) between −1 to 2.2 V showed the obvious reversible magnesium deposition/dissolution which occurred within the potential window of ~2.2V. The onset potential for 1$^{st}$ cycle Mg deposition was −0.192V, −0.243V and −0.293V for 10 mVs$^{-1}$, 25 mVs$^{-1}$ and 50 mVs$^{-1}$ scan rate respectively (see Table 1). The increase in onset potential with increasing voltage scan rate is due to solution resistance and increasing kinetic barriers with high charge transfer rate that exist in any standard electrochemical cell. A typical charge balance during cathodic plating and anodic stripping of the 1 mol L$^{-1}$ [(CH$_3$)$_3$Si]$_2$NC$_6$H$_4$MgCl]/THF solutions showed ~65% cyclic efficiency. Table 1 shows the onset deposition potential and the magnesium cyclic efficiency of the 1 mol L$^{-1}$ [(CH$_3$)$_3$Si]$_2$NC$_6$H$_4$MgCl]/THF solutions at different scan rate. It appears that the 1 mol L$^{-1}$ [(CH$_3$)$_3$Si]$_2$NC$_6$H$_4$MgCl]/THF Grignard reagent has some potential benefits like the electrochemical stability window ~1.5V but the Coulombic efficiency is very low (~65%). However, preliminary electrochemical data suggest that [(CH$_3$)$_3$Si]$_2$NC$_6$H$_4$MgCl]/THF is a Grignard reagent based Lewis base is a promising system which can be transmetallated with a strong Lewis acid (AlCl$_3$, BF$_3$ etc.) in order to improve its electrochemical performance as Aurbach et al. mentioned in literature. This prompted our interest to synthesize amidomagnesium-based electrolyte by transmetallation of the amidomagnesium chloride [(CH$_3$)$_3$Si]$_2$NC$_6$H$_4$MgCl] with a strong Lewis acid (AlCl$_3$) at different base/acid ratio and further dissolving the reaction product in tetrahydrofuran at different molar level and study their electrochemical performance.

Three different electrolytes were synthesized at three different base/acid ratio (we will call it 1:1, 2:1, and 3:1 electrolyte) as listed in Table 2.

TABLE 2

Electrochemical parameters of amidomagnesium based electrolyte compared with BEC and APC electrolyte including the anodic stability of the electrolytes on Pt working electrode.

| base/acid ratio | Onset deposition potential (V) | Anodic stripping peak potential (V) | Mg cycling efficiency (%) | Anodic stability limit in Pt (1 > 100 μAcm$^{-2}$) |
|---|---|---|---|---|
| 1:1 | −0.283 | 0.983 | 93.2 | 2.27 |
| 2:1 | −0.242 | 0.842 | 63.7 | 2.33 |
| 3:1 | −0.351 | 0.401 | 56.5 | 2.19 |
| 1:2 (BEC electrolyte) | −0.193 | 1.032 | 95 | 2.2 (known) |
| 2:1 (APC Electrolyte) | −0.37 | 0.643 | 85.5 | 3.0 (known) |

In order to validate the quality of the amidomagnesium-based three different electrolytes, it was first evaluated by cyclic voltammetry (CV) study using a three-electrode cell. The first five cycles of CV within the potential window −1 V to 2.2V performed using platinum working electrode, magnesium counter and reference electrode in 0.4M L$^{-1}$ [(CH$_3$)$_3$Si]$_2$NC$_6$H$_4$MgCl]—AlCl$_3$/THF electrolyte family demonstrated that deposition and dissolution of magnesium in the present system is highly reversible with a 1$^{st}$ cycle deposition-dissolution efficiency of ~93% for 1:1 electrolyte (Table 1). On the contrary, 1$^{st}$ cycle magnesium deposition-dissolution efficiency was ~63% and ~56% for 2:1 and 3:1 electrolytes, respectively. From the 2$^{nd}$-5$^{th}$ cycles magnesium deposition/dissolution efficiency increased to ~77% and ~85% for 2:1 and 3:1 electrolytes, respectively. The cycling efficiency for magnesium deposition-dissolution was calculated from total charge balance during reduction/oxidation for each half-cycle as described in an earlier publication. The overpotential for the deposition was observed to be −0.23V and remain steady from the 1$^{st}$ to 5$^{th}$ cycles for 1:1 electrolyte. In the case of 2:1 and 3:1 electrolytes, overpotential for the deposition was −0.24V and −0.35V respectively. The decrease in overpotential and the increasing deposition-dissolution efficiency of magnesium from the 2$^{nd}$ cycle onwards may be ascribed to the desorption of electrolyte on the working electrode. Importantly, a cyclic voltammetry study showed a minimum 5-fold increase in total current density for magnesium deposition and dissolution which suggest that transmetallation of amidomagnesium-based Grignard reagent with $AlCl_3$ increases number of active ionic-species in the electrolytes for Mg-ion transport.

The magnesium deposition and dissolution reactions on platinum substrate could be repeated hundreds of times for 1:1, 2:1, and 3:1 electrolytes as confirmed for 0.4 molar $[(CH_3)_3Si]_2NC_6H_4MgCl]$—$AlCl_3$/THF (1:1) electrolyte solution. The first three cycles for magnesium deposition-dissolution obtained from 1:1, 2:1 and 3:1 electrolytes at a given current rate of ~0.25 mAcm$^{-2}$ for 15 minutes (0.225 Ccm$^{-2}$), respectively, showed that the overpotential for $1^{st}$ cycle deposition drops drastically to a lower voltage from open circuit potential, however, the voltage steadied after 10-15 seconds. For 1:1, 2:1, and 3:1 electrolyte, the overpotential for the deposition were −0.15V, −0.06V and −0.07V for the first three cycles and dissolution were 0.1V, 0.05V, and 0.04V respectively. Low overpotential for magnesium deposition-dissolution observed from the chronopotentiogram suggested that the magnesium-ion transport was amenable in the above electrolytes. Galvanostatic cycling for the first 100 cycle magnesium deposition-dissolution on the platinum substrate gave a reoxidation cycling efficiency of ~89% and ~83%, respectively, for 1:1 and 2:1 electrolytes. The reoxidation cycling efficiency of 3:1 was found to fluctuate between ~60-80% for the first 50 cycles and then steadily increased to ~88%. In all the three cases, the reoxidation cycling efficiency was found to increase steadily from the $1^{st}$ to $20^{th}$ cycle may be due to desorption of electrolyte and electroactive species on the working electrode. In order to confirm the deposit structure, magnesium was electrodeposited on a platinum substrate from the three different amidomagnesium-based electrolytes at 0.5 mAcm$^{-2}$ for 1 hour (1.8 Ccm$^{-2}$). SEM image analysis of the platinum substrate after 1 hour deposition from 2:1 electrolyte reflected the presence of pronounced spherical particles of 1-5 μm on the surface. An EDX full frame analysis of the SEM image confirmed that the spherical particles were magnesium. The uniform spherical magnesium deposition morphology is extremely important for practical use of the electrolytes because it ensures the lack of dendrite formation in battery systems.

The electrochemical performance of the three amidomagnesium-based electrolytes at varying molar ratios was compared with BEC and APC electrolytes. The electrochemical parameters obtained from the cyclic voltammograms conducted at a 25 mVs$^{-1}$ scan rate are shown in Tables 1 and 2 including the cyclic voltammograms of the amidomagnesium-based electrolytes with a direct comparison with BEC (i.e., 0.25 molar Mg(AlCl$_2$EtBu)$_2$/THF) and APC (i.e., 0.4 molar 2(PhMgCl)—AlCl$_3$/THF) electrolyte. The 1:1 (Lewis base:Lewis acid ratio) amidomagnesium-based electrolyte demonstrated enhanced performance among all the amidomagnesium-based electrolytes synthesized. It showed a $1^{st}$ cycle Coulombic efficiency ~93% and was in excellent agreement with chronopotentiometic measurements. Table 2 lists the electrochemical parameter(s) obtained from the linear sweep voltammograms (LSV) performed at a scan rate of 1 mVs$^{-1}$ from open circuit potential to approximately 4V showing the anodic oxidative stability of the amidomagnesium-based electrolytes onto platinum working electrode compared with known anodic stability of ~2.2V and ~3V for BEC and APC electrolytes, respectively. It was found that the electrochemical stability of the amidomagnesium-based novel electrolytes was ~2.27V, ~2.33V and ~2.19V for 1:1, 2:1 and 3:1 electrolytes, respectively. The electrochemical anodic stability of the amidomagnesium-based electrolyte was similar to Aurbach's BEC electrolyte but significantly lower than APC electrolyte.

In order to validate the feasibility of the amidomagnesium-based electrolyte solutions for a magnesium battery system, $Mo_6S_8$ Chevrel phase a known magnesium-ion intercalation cathode was synthesized by molten salt (MS) route found in literature and high energy mechanical milling (HEMM) route first time reported. The 2016-type coin cell was constructed using the 0.4M L$^{-1}$ $[(CH_3)_3Si]_2NC_6H_4MgCl]$—$AlCl_3$/THF solution as the electrolyte (3:1 molar ratio), a Mg disc as a negative electrode, and $Mo_6S_8$ as a positive electrode. The 2016 coin cells were cycled at a current rate of ~C/6 (~20 mAg$^{-1}$) with the discharge and charge voltage limits of 0.5V and 1.5V versus Mg reference electrode at room temperature. The results showed that the $1^{st}$ cycle discharge and charge capacity was ~128 mAhg$^{-1}$ (100% of theoretical capacity) and ~70 mAhg$^{-1}$ with 1st cycle Coulombic efficiency ~54.8% for HEMM derived $Mo_6S_8$ cathode. The expected drop in 1st cycle capacity was due to partial charge trapping which occurred in the $Mo_6S_8$ electrode during $1^{st}$ cycle. Nevertheless, $Mo_6S_8$ electrode derived by MS and HEMM method was able to cycle magnesium reversibly and yield a discharge capacity of ~66 mAhg$^{-1}$ and ~60 mAhg$^{-1}$ calculated based on the weight of the cathode's active mass with Coulombic efficiency ~97% and ~95% respectively, between $2^{nd}$ and $50^{th}$ cycle. Typical cyclic voltammogram conducted between 0.5-1.5V at a scan rate of 0.1 mVs$^{-1}$ shows cathodic and anodic peak at ~1.0V and ~1.3V due to formation of $Mg_xMo_6S_8$ (0<x≤1) phase.

Conclusion

In summary, we have synthesized a ~2.3V amidomagnesium based magnesium electrolyte system based on the Lewis base-acid complex via a reaction between organometallic Grignard reagent $[(CH_3)_3Si]_2NC_6H_4MgCl]$ and $AlCl_3$ in tetrahydrofuran solvent. The $[(CH_3)_3Si]_2NC_6H_4MgCl]$—$AlCl_3$/THF electrolyte solution shows excellent reversibility of Mg deposition-dissolution (~90% cycling efficiency for reversible magnesium deposition), and electrochemical anodic stability (2.3V vs. Mg reference electrode). In addition, the good compatibility of the amidomagnesium-based electrolyte solution with the $Mo_6S_8$ intercalation cathode derived by molten salt as well as high energy mechanical milling route confirms that the electrolyte could be practically used in 2V rechargeable Mg battery systems.

Example XIII

High energy mechanical milling (HEMM) of a stoichiometric mixture of molybdenum and copper chalcogenide (CuT and CuT$_2$), followed by a short thermal treatment at elevated temperature was applied to synthesize Chevrel phases ($Cu_2Mo_6Z_8$; Z=S, Se), a cathode precursor for magnesium battery. Differential scanning calorimetry, thermogravimetric analyses, combined with X-rays diffraction and scanning electron microscopy was used to evaluate the phase transformation(s) during milling and thermal treatment. It was shown that CuS and Mo reacted at elevated temperature and formed an intermediate ternary Chevrel phase which further reacted with residual Mo and $MoS_2$ to form the desired $Cu_2Mo_6S_8$. Quantitative XRD analyses showed the formation of ~96-98% Chevrel phase as low as 30 minutes time during post milling thermal treatment process. Electrochemical performance of de-cuprated $Mo_6S_8$ and $Mo_6Se_8$ phase were evaluated by cyclic voltammetry (CV), galvanostatic cycling, electrochemical impedance spectroscopy (EIS). CV and galvanostatic cycling data of $Mo_6S_8$ and $Mo_6Se_8$ electrodes showed expected anodic/cathodic behavior and a stable capacity after $1^{st}$ cycle with the formation of $Mg_xMo_6Z_8$ (Z=S, Se; x=1≤x≤2). EIS at ~0.1 V intervals of $Mo_6S_8$ electrode during $1^{st}$ and $2^{nd}$ cycle showed that partial Mg-ion trapping caused increased charge transfer resistance, $R_c$. Carbon incorporation during milling resulted in improved capacity fade in the case of $Mo_6Se_8$ electrode and ~99.93% Coulombic efficiency was achieved. Importantly, ease of fabrication, stable capacity, high Coulombic efficiency and excellent rate retention rendered HEMM-derived Chevrel phases as suitable magnesium battery cathodes for stationary electrical energy storage (EES) applications.

Electrochemical performance of HEMM-derived $Mo_6S_8$ and $Mo_6Se_8$ phase devoid of copper was evaluated in 2016 coin cell by cyclic voltammetry, and galvanostatic cycling at various C– rates. The Chevrel phase(s) exhibited competitive electrochemical results and provided a time saving, rapid approach.

Materials Synthesis $CuxMo6S8$ was synthesized as follows using an HEMM approach in accordance with certain embodiments of the invention. Stoichiometric amounts of $MoS_2$ (1 g, 99% Alfa Aesar), Mo (0.6 g, 99.9% Alfa Aesar), and CuS (0.4 g, 99.8% Alfa Aesar) were batched in a stainless steel vial (powder: ball ratio=1:10). The powders were mechanically milled in atmospheric condition for 30 minutes, 1 hour, 2 hours, and 3 hours in a SPEX-8000M shaker mill and subjected to XRD analysis. $Cu_xMo_6Se_8$ was also synthesized using a similar approach. Stoichiometric amounts of $MoSe_2$ (1.141 g, 99.9% Alfa Aesar), Mo (0.432 g, 99.9% Alfa Aesar), and CuSe (0.427 g, 99.5% Alfa Aesar) were batched in a stainless steel vial (powder: ball ratio=1:10). The powders were mechanically milled for 30 minutes, 1 hour, 2 hours, and 3 hours, and subjected to XRD analysis. The milled powder was thermal treated at elevated temperature under ultra-high purity Argon (UHP-Ar) atmosphere. Copper-ions were leached from HEMM-derived ternary Chevrel phase(s) using 6 molar hydrochloric acid solution under constant oxygen flow for 8 hours in ambient atmosphere. After copper-ions were leached completely from the parent phase, the acid solution containing the residue was centrifuged, washed with de-ionized water three times and dried in an oven at ~323K.

Materials Characterization

The thermal behavior of the milled powder was evaluated by thermo-gravimetric (TG)/differential scanning calorimetry (DSC) using a Netzsch STA 409 PC Luxx thermal analyzer unit in an ultra UHP-Ar atmosphere at a heating rate of 10 K/min, up to 1273K. The milled powder samples were isothermally heat treated at 1273K for 30 minutes under UHP-Ar atmosphere followed by X-rays diffraction (XRD) analyses. In addition, the mechanically milled powder was thermal treated at elevated temperature for different durations (30 minutes, 5 hours) under UHP-Ar atmosphere. Powder X-ray diffraction (XRD) of the milled, commercial and thermally-treated powders was carried out using the Philips PW1830 system employing the $CuK_\alpha$ ($\lambda$=0.15406 nm) radiation. Quantitative phase analysis was carried out using PANalytical X'Pert HighScore Plus Rietveld program on the powder XRD patterns. No other attempt was made to determine the composition obtained from the HEMM approach at high temperature. Microstructural analyses of the milled, commercial and heat treated powders (Chevrel phases) were performed using a scanning electron microscopy (JSM-6610, JEOL) operating at 10 kV and high resolution transmission electron microscopy-HRTEM (JEOL JEM 2000FX) operating at 200 kV. Specific surface area of the milled powder was measured using the Brunauer-Emmett-Teller (BET) technique. Each sample was vacuum degassed and then tested using a Micromeritics ASAP 2020.

Electrochemical Characterization

Electrode slurry was formulated by mixing 80 wt. % of active material (–325 mesh), 10 wt. % Super-P carbon, 10 wt. % polyvinylidene fluoride (PVDF) binder with N-methylpyrrolidinone (NMP) solvent together in a glass vial with constant magnetic stirring for 24 hours. The slurry obtained was coated (50 μm thick) onto graphite foil acting as a current collector and dried at ~383K overnight in a vacuum oven. Further, the dried electrodes were uniaxially pressed at ~5 MPa to improve the particle contacts and then circular disks (Θ=11.28 mm) were punched with an active material loading ~1-3 $mg/cm^2$. An electrochemical test was carried out at room temperature with 2016-type coin cells assembled inside an argon-filled MBraun Inc. glove box (<0.1 ppm each of $O_2$ and $H_2O$) employing magnesium foil as the counter and reference electrode, electrode disks as working electrode, and Celgard® separator soaked in an electrolyte solution of 0.4 molar 2(PhMgCl)—$AlCl_3$/tetrahydrofuran. Cyclic voltammogram (CV) was acquired using an electrochemical workstation (VersaSTAT 3, Princeton Applied Research) at a constant sweep rate of ~0.001 $Vs^{-1}$. Galvanostatic charge-discharge cycles were carried out at various rates ~20-160 $mAg^{-1}$ within 0.5-1.5V or 0.5-1.7V, employing a short rest period between the charge/discharge cycles using a multichannel battery testing system (Arbin BT2000 instrument). Electrochemical impedance spectroscopy (EIS) was performed to understand the charge storage behavior in Chevrel phases. EIS was performed on the Versastat 3 over a frequency range of 0.01 Hz-100 KHz. An A.C. amplitude of 5 mV was used and the spectra were obtained after charge/discharge cycles. The charge transfer characteristics and accompanying parameters were analyzed by equivalent circuit modeling using Z-View (Scribner Associates, Inc.; version 3.3).

Results and Discussion

Synthesis of $Cu_xMo_6S_8$ Chevrel phase by HEMM approach

Each as-received commercial powder as well as mechanically milled powders was subjected to XRD analysis. The major XRD peaks from commercial powders can be indexed with standard Mo (ICDD number: 98-006-2711; cubic; space group Im-3 m, number 229), CuS (ICDD number: 01-079-2321; hexagonal; space group P63/mmc, number 194), and $MoS_2$ (ICDD number: 03-065-7025; hexagonal; space group P63/mmc, number 194) phase. From the XRD pattern of mechanically milled powders, it appeared that gradual increase in milling duration from 30 minutes to 3 hours induced a homogeneous mixture between CuS, Mo, $MoS_2$ phase. The Bragg reflection of high intensity peaks from $MoS_2$, Mo and CuS were evident in the XRD patterns of milled powders. The absence of any peaks besides CuS, Mo and $MoS_2$ suggested that mechanical milling only induced an intimate mixture between the constituent phases rather than forming any new phase(s). However, gradual increase in milling duration would likely induce an X-rays amorphization of the $MoS_2$ and CuS phase either due to formation of ultrafine particles or diffusive mixing mechanisms initiated between CuS and $MoS_2$ phase which would significantly decrease the peak intensity and allow peak broadening. The relative intensity of peaks from (002), (010), (013), (105) and (112) planes of $MoS_2$ and (102), (013), (006), (110) planes of CuS were significantly reduced and peaks were broadened as the milling duration increased from 30 minutes to 3 hours. The Braggs reflection from (011), (002), (112), and (022) planes reflected from elemental Mo were found relatively intense. The difference in peak intensities and broadening during milling operation was mainly due to a difference in the hardness of starting compositions, where ductile and hard Mo metal powder repeatedly got fractured and cold welded whereas brittle and soft $MoS_2$, and CuS ceramic phase got fragmented and embedded within the ductile Mo matrix during milling operation.

SEM images of the commercial powder used during milling showed unique morphology of the particles before milling. CuS particles were of irregular shape and agglomerated, whereas $MoS_2$ were large and flaky, and Mo particles were round and globular. Following 30 minutes of mechanical milling, the morphology of the particles changed completely and irregular shape particles were formed. SEM image of the 30 minute-milled powder showed formation of agglomerated irregular shaped particles mechanically bonded together. Quantitative elemental composition of the milled powder obtained by EDX analyses confirmed that measured atomic percent of each element (Cu, Mo, and S) was close to the stoichiometric batch composition. The elemental X-ray mapping of Cu, Mo, and S atoms in the milled powder showed homogeneous distribution of Cu, Mo, and S within the agglomerated particles without segregation on any specific site. Importantly, absence of any oxides of copper and molybdenum up to 3 hours of milling was evident from the XRD patterns which suggested that milling between CuS, $MoS_2$, and Mo in atmospheric conditions does not oxidize or contaminate the milled composition. However, mechanical milling did not form the desired ternary CP (since Chevrel phase formation is a thermally activated process and requires thermal treatment at elevated temperature under inert atmosphere to form the desired phase). The Brunauer-Emmett-Teller (BET) surface area measurement by nitrogen adsorption/desorption technique of the milled powder was ~12.33 $m^2/g$, 14.61 $m^2/g$, 7.72 $m^2/g$, and 9.65 $m^2/g$, for 30 minute-, 1 hour-, 2 hours-, and 3 hours-milled powder sample, respectively. From the surface area measurement it appeared that mechanical milling beyond 1 hour had no effect on reduction of surface area of milled particles. However, to complete the formation of homogeneous mixture between the constituents the mechanical milling was continued up to 3 hours.

To assess phase formation during thermal treatment of the mechanically milled powder, selected milled samples were subjected to thermo gravimetric-differential scanning calorimetry (TG-DSC) under UHP-Ar atmosphere up to 1273K at a constant heating rate of 10K/min. The TG-DSC trace showed a continuous exothermic behavior of the milled powder samples. The 30 minutes-milled sample showed a broad exothermic peak between 600-1260K associated with an enthalpy of formation ~775 J/g (~743 $kJmol^{-1}$) approximated to the calculated enthalpy of formation (~873 $kJmol^{-1}$) for $Cu_2Mo_6S_8$ at 1000K. DSC traces of 1 hour- and 3 hour-milled powder samples showed a continuous exothermic behavior beyond 600K with no apparent exotherms up to 1273K. However, thermo gravimetric (TG) curves exhibited ~4% weight loss between ~525K to ~630K for each sample. The 4% weight loss associated with TG analysis was accompanied by heat evolution in the DSC curves which suggested that an exothermic process was initiated. To assess the exothermic reaction processes evolved with DSC scan of milled powder sample, each of the constituents (CuS, Mo and $MoS_2$ powder) used during milling was subjected to TG-DSC under identical conditions. The thermo gravimetric trace of Mo and $MoS_2$ commercial powder showed no appreciable weight change. However, CuS showed ~16% weight loss when heated to ~745K that was accompanied by an endothermic reaction (enthalpy of formation: -206 J/g or 19.7 kJ/mol) between ~686K to ~773K with the peak endotherm at ~745K. Without intending to be bound by any particular theory, it is believed that the endothermic peak was due to formation of $Cu_2S$ and sulfur-rich liquid phase from CuS since the thermodynamic measurement of enthalpy of formation for peritectic decomposition of CuS to $Cu_2S$ and S-rich liquid was ~17.87 kJ/mol. The formation of $Cu_2S$ from CuS resulted in a 16% weight difference according to the following formula:—2CuS (2×95.61)=$Cu_2S$ (159.16)+S (32.06). The ~4% weight loss (¼th of ~16%) observed was related to the phase transformation of CuS to $Cu_2S$ and sulfur-rich liquid phase and was in agreement with the following formula:—2CuS+3Mo+3$MoS_2$=$Cu_2Mo_6S_8$. It is believed that the sulfur-rich liquid reacted immediately with elemental Mo and formed the $MoS_2$ phase which subsequently reacted with $Cu_2S$, unreacted Mo and $MoS_2$ and formed the desired ternary copper CP according to the following formula—$Cu_2S$+3$MoS_2$+x$MoS_2$+(3−x)Mo+(1−2x)S=$Cu_2Mo_6S_8$.

To assess the details of phase formation during thermal treatment, equimolar amounts of Mo (~1 g) and CuS(~1 g) were mechanically milled for 30 minutes and subjected to TG-DSC. The TG-DSC trace of CuS—Mo powder exhibited three regions, a small endothermic hump at ~714K (due to peritectic reaction and melting of CuS to $Cu_2S$ and S) associated with ~8% weight loss, a plateau between 714K-800K, and a continuous exothermic region beyond 800K up to 1273K. It appeared that the peritectic reaction at ~714K occurred slightly earlier than expected likely due to mechanical milling having decreased the particle size and collapsed the hexagonal crystal structure of CuS. The XRD pattern of the mechanically milled powder showed the presence of Mo and CuS phase. XRD analysis was performed on the remnant powder after the TG-DSC test was completed. The XRD showed the formation of $Cu_{1.83}Mo_3S_4$ phase (ICDD: 98-000-5103), along with elemental Mo and Cu. It is believed that CuS dissociated into $Cu_2S$ and elemental sulfur and further reacted with Mo to form the $Cu_{1.83}Mo_3S_4$ Chevrel phase according to the following reactions:

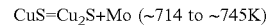
CuS=$Cu_2S$+Mo (~714 to ~745K)

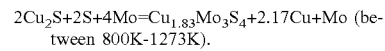
2$Cu_2S$+2S+4Mo=$Cu_{1.83}Mo_3S_4$+2.17Cu+Mo (between 800K-1273K).

Thermal treatment of CuS+Mo powder was carried out inside a tube furnace at two different temperatures of ~773K (above the peritectic temperature of CuS) and ~1273K at a heating rate of 10K/min and allowed the powder to furnace cool under UHP-Ar atmosphere. The XRD pattern of the sample thermally treated to ~773K showed the presence of $Cu_2S$ and elemental Mo, whereas, the sample heated to ~1273K showed the formation of $Cu_{1.83}Mo_3S_4$, Cu and Mo peaks. Similar study between equimolar Mo (0.75 g) and $MoS_2$ (1.25 g) showed the small endotherm ~711K associated with ~8% weight loss due to peritectic melting of CuS in the TG-DSC trace. However, the CuS+$MoS_2$ milled powder when heated to ~773K and ~1273K respectively, showed no traces of Chevrel phase formation confirmed by XRD analyses, instead $Cu_2S$ and $MoS_2$ phase were intact. The above evaluations suggested that the presence of CuS and Mo in the starting composition was essential for the formation of ternary copper CP. One possible reaction scheme for the formation of $Cu_2Mo_6S_8$ ternary CP at elevated temperature may be $Cu_{1.83}Mo_3S_4+2.17Cu+Mo+2Mo+6MoS_2=2Cu_2Mo_6S_8$.

To assess whether ternary CP can be formed during thermal treatment, a XRD analysis of the remnant powder was conducted following completion of the TG-DSC on 2CuS+3Mo+3MoS$_2$ samples milled for 30 minutes and 1 hour. The alumina crucible used during the TG-DSC test was carefully opened upon cooling to room temperature and the sample (~10 mg) was evenly spread onto a glass slide and a XRD analysis between 10-90° 2θ value was performed. Unexpectedly, the XRD data of a 1 hour milled sample heated to 1273K at a constant heating rate of ~10K/min showed the formation of $Cu_2Mo_6S_8$ phase along with unreacted $MoS_2$, Mo, and MoO2 phase as impurities. It is believed that $Cu_2Mo_6S_8$ was formed before the temperature was reached to 1273K. However, incomplete formation/transformation of $Cu_2Mo_6S_8$ phase was mainly due to insufficient time to allow completion of the solid state diffusive reaction to occur between the constituents. A similar TG-DSC evaluation was repeated up to 1273K with an additional 30 minute-holding time at 1273K with 1 hour- and 3 hour-milled powders. The XRD analysis performed on 1 hour- and 3 hour-mechanically milled powder following TG-DSC test showed the formation of $Cu_2Mo_6S_8$ phase with minor unreacted $MoS_2$ and Mo. According to the Cu—Mo—S ternary phase diagram at 1273K, $Cu_xMo_6S_8$ phase could co-exist with $MoS_2$ and metallic Mo and appear as minor impurities during high temperature synthesis in ternary Chevrel phase, $M_xMo_6S_8$ (M=Cu, Sn). The above results were encouraging and indicated that ternary copper CP ($Cu_2Mo_6S_8$) could be formed using CuS, Mo, and $MoS_2$ powder at 30 minute-dwell time at 1273K peak temperature. The magnified portion between 12-16° of the XRD data clearly showed that 30 minute-dwell time at 1273K had a pronounced effect on $Cu_2Mo_6S_8$ formation, as the high intensity peak from (002) plane of $MoS_2$ was significantly reduced at the expense of peak intensity from (101) plane of $Cu_2Mo_6S_8$ phase. An ~2 g powder sample of 30 minute- and 1 hour-milled powder was placed on a corundum crucible and thermally treated inside a tubular furnace with a heating rate of 10K/min at two different temperatures of 1123K and 1273K with a 30 minute-dwell time at peak temperature followed by cooling to room temperature at a constant cooling rate of 10K/min (the above experiments were done under UHP-Ar, gas flow rate ~100 standard cubic centimeter/min). The heat-treated powder analyzed by XRD showed the formation of ternary copper CP—$Cu_2Mo_6S_8$. The 30 minute-mechanically milled powder sample thermally treated to 1123K with 30 minute-dwell time showed the formation of $Cu_2Mo_6S_8$ with slight presence of unreacted $MoS_2$ and Mo powder. However, the 30 minute- and 1 hour-milled powder samples when heated to 1273K with 30 minute-dwell time at the peak temperature, the $MoS_2$ peak was completely vanished and fully crystalline $Cu_2Mo_6S_8$ phase was formed. The magnified portion between 12-16° of the XRD patterns depicted the high intensity peak from (101) plane of $Cu_2Mo_6S_8$ phase matched completely with the standard $Cu_2Mo_6S_8$ database (ICDD number: 00-047-1519). Secondary electron SEM image of the $Cu_2Mo6S_8$ phase synthesized at 1123K and 1273K with 30 minute-dwell time at peak temperature showed the formation of sub-micron to micrometer size irregular shaped particles. The composition, obtained by EDX quantitative analyses, of the copper Chevrel phase formed at 1123K and 1273K, respectively, was in good agreement with TG-DSC/XRD data and suggested that rapid synthesis of $Cu_2Mo_6S_8$ by HEMM was possible and could be achieved as low as at 30 minutes. Lattice parameter(s) calculated using the least-square method of the experimental XRD data was in good agreement with the standard $Cu_2Mo_6S_8$ (ICDD number: 00-047-1519; a=0.9584 nm, c=1.025 nm, unit cell volume=815.36×10$^{-3}$ nm$^3$) unit cell parameters and presented in Table 1.

Phase Formation and Electrochemical Activity of HEMM Derived De-Cuprated $Mo_6S_8$ To obtain the de-cuprated $Mo_6S_8$ phase, $Cu_2Mo_6S_8$ phase formed at 1123K and 1273K was treated with 6 molar hydrochloric acid solution with constant $O_2$ bubble for 7 hours in a round bottom flask. In order to confirm the formation of $Mo_6S_8$ after complete copper leaching, XRD analysis was performed. All the Braggs peaks in the XRD patterns matched with the standard $Mo_6S_8$ (ICDD: 98-005-708) pattern which suggested complete copper removal was achieved. EDX full frame analyses also confirmed that hydrochloric acid-treated samples were devoid of copper. High resolution SEM image of the respective $Mo_6S_8$ phase showed agglomerated particles of submicron to micrometer size. Electrochemical performance of the 80 wt. % $Mo_6S_8$: 10 wt. % Super-P: 10 wt. % PVDF composite electrode was evaluated in a 2016 coin cell. The galvanostatic cycling conducted at ambient condition between 0.5-1.7V with a current of 20 mAg$^{-1}$ (~C/6 rate) showed 1$^{st}$ cycle discharge capacity of ~101 mAhg$^{-1}$ and ~100 mAhg$^{-1}$ for de-cuprated $Cu_2$CP formed at ~1123K and ~1273K, respectively. A steady and expected discharge capacity of ~68 mAg$^{-1}$ and ~70 mAhg$^{-1}$ was achieved from 2$^{nd}$ to 100$^{th}$ cycle due to partial Mg-ion trapping within Mo6S8 structure and associated 30% drop in capacity in the 1st cycle. The cyclic voltammogram of the $Mo_6S_8$ electrode showed expected signature of two anodic peaks during magnesiation and a cathodic peak during de-magnesiation, respectively.

To achieve the fully crystalline phase pure $Cu_2Mo_6S_8$ ternary CP, dwell time at peak temperature of ~1273K was increased to 5 hours. The XRD pattern of 3 hour-mechanically milled powder heat treated at 1273K with holding time of 5 hours at peak temperature confirmed the complete formation of $Cu_2Mo_6S_8$. De-cuprated $Mo_6S_8$ was obtained after complete copper removal using a 6 molar HCl solution with constant oxygen bubbling for 7 hours. The lattice parameter(s) calculated using least-square method of $Cu_2Mo_6S_8$ phase formed after 3 hour-mechanically milled powder thermally treated at ~1273K with 5 hours dwell time at peak temperature are shown in Table 4 and were in good agreement with standard unit cell parameter(s).

TABLE 4

Calculated lattice parameter(s) of $Cu_xMo_6S_8$ phase

| Condition | Lattice parameter(s) of $Cu_2Mo_6S_8$ | Quantitative Phase formation (%) |
|---|---|---|
| 1 h mechanically milled powder thermally treated to 1273K with 30 min hold at 1273K | $a_H$: 0.963138 nm, $c_H$: 1.021042 nm $a_R$: 0.651957 nm, $\alpha_R$: 95.233° unit cell volume = 820.2588 × 10$^{-3}$ nm$^3$ | 0.3% Mo + 99.7% $Cu_2Mo_6S_8$ |
| 30 min mechanically milled powder thermally treated to 1273K with 30 min hold at 1273K | $a_H$: 0.962119 nm, $c_H$: 1.021095 nm $a_R$: 0.651464 nm, $\alpha_R$: 95.1953° unit cell volume = 818.567 × 10$^{-3}$ nm$^3$ | 0.3% Mo + 99.7% $Cu_2Mo_6S_8$ |

TABLE 4-continued

Calculated lattice parameter(s) of $Cu_xMo_6S_8$ phase

| Condition | Lattice parameter(s) of $Cu_2Mo_6S_8$ | Quantitative Phase formation (%) |
|---|---|---|
| 30 min mechanically milled powder thermally treated to 1123K with 30 min hold at 1123K | $a_H$: 0.959014 nm, $c_H$: 1.022991 nm $a_R$: 0.650268 nm, $\alpha_R$: 95.0207° unit cell volume = 814.8032 × 10⁻³ nm³ | 1.4% $MoS_2$ + 0.3% Mo + 98.3% $Cu_2Mo_6S_8$ |
| 3 h mechanically milled powder thermally treated to 1273K with 5 h hold at 1273K | $a_H$: 0.961938 nm, $c_H$: 1.021293 nm $a_R$: 0.65141 nm, $\alpha_R$: 95.1822° unit cell volume = 818.4188 × 10⁻³ nm³ | 100% $Cu_2Mo_6S_8$ |

Whereas, lattice parameter(s) of de-cuprated Mo6S8 calculated using the least-square method (a=0.919233 nm, c=1.087942 nm, unit cell volume=796.1371×10⁻³ nm³) were found to be in excellent agreement with the standard $Mo_6S_8$ (ICDD number: 98-005-1708; a=0.92 nm, c=1.088 nm, unit cell volume=797.51×10⁻³ nm³) unit cell parameters showed that complete removal of copper was achieved. The SEM image of $Cu_2Mo_6S_8$ and de-cuprated $Mo_6S_8$ showed irregular shape submicron size particles were formed in the case of $Cu_2Mo_6S_8$ phase, which retained their morphology in the de-cuprated $Mo_6S_8$ phase also. The HRTEM lattice fringe spacing of $Cu_2Mo_6S_8$ and $Mo_6S_8$ phase was calculated as ~0.645 nm and ~0.479 nm which corresponded to the interplanar d-spacing of (101) and (102) planes for $Cu_2Mo_6S_8$ and ~0.641 nm for $Mo_6S_8$ corresponding to the interplanar d-spacing of (101) plane (hexagonal crystal system: space group R-3). The de-cuprated $Mo_6S_8$ phase was tested as magnesium battery cathode in a 2016 coin cell setup using 2(PhMgCl)—$AlCl_3$/tetrahydrofuran electrolyte and polished Mg foil as anode. The electrochemical performance of $Mo_6S_8$ composite electrode showed outstanding performance where Mg-ions could be inserted/extracted reversibly from $Mo_6S_8$ phase. The cyclic voltammogram acquired at a sweep rate of 0.1 mVs⁻¹ between 0.5-1.75V versus Mg/$Mg^{2+}$ showed typical reversible magnesiation/demagnesiation phenomena of $Mo_6S_8$ electrode where magnesiation and demagnesiation occurred at ~1V and ~1.28V, respectively. The galvanostatic cycling of $Mo_6S_8$ electrode showed $1^{st}$ cycle discharge (magnesiation) and charge (demagnesiation) capacity of ~92 mAhg⁻¹ (~72% of theoretical capacity 128 mAhg⁻¹) and ~57 mAhg⁻¹ with Coulombic efficiency ~62% when cycled at a current density of 20 mAg⁻¹. Between $2^{nd}$ and $107^{th}$ cycle a stable discharge and charge capacity of ~62 mAg⁻¹ and 67 mAg⁻¹ was observed with 95.6% Coulombic efficiency. The expected drop in capacity from $2^{nd}$ cycle onwards was due to one Mg-ion trapping which occurred within the $Mo_6S_8$ framework at $1^{st}$ cycle resulting in a capacity loss from the theoretical value (~128 mAhg⁻¹). Capacity versus voltage profile of $25^{th}$, $50^{th}$, and $100^{th}$ cycle exhibited magnesiation and demagnesiation reaction plateaus at ~1.07V and ~1.2V and was in agreement with a CV curve and literature. Rate retention of $Mo_6S_8$ electrode was also excellent, at C/24, C/12, C/6, C/4, C/3, C/2, 1C (1C~120 mAg⁻¹) and 1.5C current rate discharge capacity of ~79 mAhg⁻¹, ~74 mAhg⁻¹, ~70 mAg⁻¹, ~65 mAhg⁻¹, ~62 mAhg⁻¹, ~59 mAhg⁻¹, ~56 mAhg⁻¹, ~51 mAhg⁻¹ and ~49 mAhg⁻¹ was achieved with Coulombic efficiency ~96.8%, ~94.2%, ~97.1%, ~99.2%, ~99.9%, ~99.9%, ~99.7%, ~99.9%, and ~99.2%, respectively. In addition, long cycle stability of $Mo_6S_8$ electrode was tested in a 2016 coin cell setup and showed remarkable performance and durability. The 2016 coin cell cycled continuous 48 days and was able to deliver a sp. capacity ~70 mAhg⁻¹ with a Coulombic efficiency ~99% at $330^{th}$ cycle. These attributes support the HEMM approach for rapid synthesis of $Cu_2Mo_6S_8$ Chevrel phase, and as an alternative synthesis route for ternary CP.

Synthesis of $Cu_xMo_6Se_8$ Chevrel Phase by HEMM Approach

It was demonstrated that $Cu_2Mo_6S_8$ could be synthesized by HEMM approach and its electrochemical performance in a magnesium battery was competitive with electrochemical data for known synthesis methods. This similar HEMM approach was employed for the synthesis of ternary Chevrel phase —$Cu_2Mo_6Se_8$ using CuSe, Mo, and $MoSe_2$ as starting powders. XRD analyses showed powder XRD patterns of 30 minutes, 1 hour, 2 hours, and 3 hours mechanically milled powder of 2CuSe+3$MoSe_2$+3Mo nominal composition. The XRD patterns from the commercial powders were also acquired and compared. The major XRD peaks of commercial powders were indexed with Mo, $MoSe_2$ (ICDD number: 03-065-7025; hexagonal; space group P63/mmc, number 194), and CuSe (ICDD number: 98-007-1382; hexagonal; space group P63/mmc, number 194) phase along with minor $Cu_3Se_2$ (ICDD number: 98-000-6312) as impurities. A gradual increase in milling duration from 30 minutes to 3 hours likely induced a homogeneous mixture between CuSe, Mo, $MoSe_2$ phase. The XRD patterns showed the Bragg reflections of high intensity peaks from $MoSe_2$, Mo are present but the CuSe peaks completely vanished after 2 hours of milling. Importantly, the absence of oxides of copper and molybdenum during milling operation indicated that mechanical milling between CuSe, $MoSe_2$, and Mo phase was also conducive for direct synthesis of $Cu_2Mo_6Se_8$ phase. SEM images of the CuSe, and $MoSe_2$ commercial powder used during milling showed unique morphology of the particles before milling. CuSe particles were plate-like, whereas $MoSe_2$ particles were large and flaky. However, upon 30 minutes of milling the morphology of the particles changed completely and irregular shape particles were formed. SEM image of the 30 minutes milled powder showed the formation of agglomerated irregular shape particles. EDX full frame analysis confirmed the stoichiometry of the batch composition was maintained. Elemental X-ray mapping analysis confirmed the distribution of Cu, Mo, and Se atoms in the milled powder were homogeneous throughout the microstructure. However, it is to be noted that direct mechanical milling did not form the desired ternary CP and thermal treatment at elevated temperature under inert atmosphere was required. The BET surface area of the 30 minutes, 1 hour, 2 hours, and 3 hours milled powder was ~5.82 m²/g, ~3.87 m²/g, ~2.09 m²/g, and ~2.29 m²/g, respectively. The BET surface area measurement showed that 30 minutes of milling generated the fine particles and further milling had no pronounced effect on particle size. However, the milling duration was continued up to 3 hours to complete the formation of homogeneous mixture between the constituents.

The thermal behavior of the 30 minutes, 1 hour, 2 hours and 3 hours mechanically milled powder was evaluated by thermo gravimetric-differential scanning calorimetry (TG-DSC). The samples were heated under UHP-Ar atmosphere up to ~1273K at a constant heating rate of 10K/min. DSC trace of 30 minutes sample showed a continuous exothermic behavior up to ~624K followed by a plateau up to ~745K. The thermo gravimetric (TG) curve exhibited a ~7% weight loss within the above temperature range. However, there was no further weight loss beyond ~624K and a continuous exothermic behavior was observed up to ~1273K. To assess the exothermic/endothermic behavior evolved with TG-DSC scan of milled powder sample, each constituent used during milling was subjected to TG-DSC under identical conditions. The TG-DSC trace of commercial CuSe, Mo, and $MoSe_2$ powder from room temperature to ~1273K showed no appreciable weight change of $MoSe_2$ commercial powder. However, CuSe showed ~23% weight loss between 646K-860K reflected in the TG curve, that was accompanied by two endothermic reaction peaks at ~658.8K (enthalpy: 68.45 J/g or 9.75 kJ/mol) and at ~798K (enthalpy: 10.83 J/g or 1.54 kJ/mol) in the DSC trace. The endothermic peak observed at ~658.8K was due to incongruent melting of CuSe and formation of $Cu_2Se$ and Se-rich liquid and the second endothermic peak observed at ~798K was due to eutectic melting of $Cu_2Se$ and sulfur-rich phase according to the copper-selenium binary phase diagram. Previous studies showed that enthalpy of formation for peritectic decomposition of CuSe to $Cu_2Se$ and Se-rich liquid was ~11.8±0.03 kJ/mol and was in agreement with experimental data. The formation of $Cu_2Se$ and Se-rich liquid from CuSe at ~658.8K observed in the DSC curve resulted in a 27.7% weight loss according to the following formula:—2CuSe (2×142.51)=$Cu_2Se$ (206.05)+Se (78.96). Thus, the ~7% weight loss (¼th of ~27.7%) was related to the phase transformation of CuSe to $Cu_2Se$ phase and was in excellent agreement with the following formula:—2CuSe+3Mo+ $3MoSe_2$=$Cu_2Mo_6Se_8$. It was believed that Se-rich liquid reacted immediately with Mo powder and formed the $MoSe_2$ phase and further, the remaining constituents ($Cu_2Se$, Mo and $MoSe_2$) reacted with each other and formed the desired $Cu_2Mo_6Se_8$ phase.

$$Cu_2Se+3MoSe_2+xMoSe_2+(3-x)Mo+(1-2x)Se=Cu_2Mo_6Se_8$$

The thermal treatment of milled powder at elevated temperature was important to initiate liquid-phase sintering between the constituents. To assess the phase formation during heat treatment, ~2 g of 1 hour mechanically milled powder sample of nominal composition 2CuSe+3Mo+ 3MoSe2 was heated inside a tubular furnace with a heating rate of 10K/min at various temperatures followed by cooling to room temperature at a constant cooling rate of 10K/min (these experiments were done under UHP-Ar atmosphere with gas flow rate ~100 standard cubic centimeter/min). The XRD pattern of the sample heated to ~733K could be indexed with Mo, $MoSe_2$, Cu2Se and MoO2 phases. The presence of (11-1) MoO2 peaks at 26.0○ 2□ value was likely a result of the oxidation of Mo to MoO2 during thermal treatment due to unavoidable presence of trace amount of oxygen inside the furnace. In addition, Cu2Se phase [presence of (111) peak at 26.7○ 2□ value] was evident instead of CuSe in the XRD pattern due to congruent melting of CuSe to Cu2Se and Se-rich liquid at ~659K according to the TG-DSC analysis. However, there was no Bragg's reflection observed from elemental Se in the XRD pattern which suggested that Se-rich liquid immediately reacted with Mo and formed the MoSe2 phase. This is supported by the TG-DSC analysis of 1 hour milled powder as an exothermic peak observed at ~735K due to formation of MoSe2 phase. MoSe2 could be formed as low as ~650K and stable over wide temperature range between ~273K to ~1473K according to the Mo—Se binary phase diagram. The XRD patterns of the sample heated to ~925K and ~1000K showed similar XRD peaks with the sample heated to ~733K which corroborated that higher temperature beyond ~1000K is required for CuxMo6Se8 phase to be formed. The powder sample when heated to ~1089K showed the formation of Cu2Mo6Se8 phase with the presence of elemental Mo, MoSe2, and MoO2 as impurities. The absence of high intensity peak from (111) plane of Cu2Se phase at 26.7○ 2□ value in the XRD pattern except the ~733K sample suggested that Cu2Se started to disappear above 800K due to eutectic melting of Cu2Se phase which likely reacted with Mo and MoSe2 phase and nucleated the desired ternary selenium CP phase analogous to the case observed with sulfur CP (shown above). As expected, the sample when heated to ~1151K also showed the formation of Cu2Mo6Se8 phase. However, phase-pure CuxMo6Se8 was not detected in the XRD patterns when the sample heated to ~1089K or ~1151K due to insufficient dwell time at the respective temperature allowed for complete transformation to occur. Intrigued by the above observation, ~2 g sample of 30 minutes, 1 hour, 2 hours, and 3 hours of mechanically milled powder was placed on a corundum crucible and thermally treated at ~1151K with 30 minute dwell time at the peak temperature inside a tubular furnace under argon atmosphere. The powder XRD analysis of the heat-treated powder confirmed the formation of ternary copper CP—Cu2Mo6Se8 with slight presence of unreacted Mo, MoO2 and MoSe2 phase. Full frame quantitative EDX analyses of the low magnification (1000×) SEM images also proved the presence of Cu, Mo and Se atoms in the ternary CuMoSe8 phase formed at 1151K with 30 minute dwell time as well as in the hydrochloric acid treated de-cuprated Mo6Se8 phase. The above data was encouraging and in good agreement with TG-DSC, and suggested that synthesis of fully crystalline Cu2Mo6Se8 phase was possible by HEMM approach as low as 30 minutes at ~1151K. Lattice parameter(s) of Cu2Mo6Se8 phase were calculated using the least-square method of the experimental data and are presented in Table 5. The excellent agreement of lattice parameters with the standard unit cell parameter(s) of Cu2Mo6Se8 reported in the literature suggested that the HEMM approach could be applied successfully for the synthesis of selenium CP with minimal thermal treatment required at ~1151K under argon atmosphere.

TABLE 5

Calculated lattice parameter(s) of $Cu_xMo_6Se_8$ phase

| Condition | Lattice parameter(s) of $Cu_2Mo_6Se_8$ | Quantitative Phase formation (%) |
| --- | --- | --- |
| 1 h mechanically milled powder thermally treated to 1089K | $a_H$: 0.999259 nm, $c_H$: 1.072559 nm $a_R$: 0.678719 nm, $α_R$: 94.8065° unit cell volume = 927.4872 × 10⁻³ nm³ | 0.2% Mo + 1.8% $MoO_2$ + 1.7% $MoSe_2$ + 96.3% $Cu_2Mo_6Se_8$ |
| 1 h mechanically milled powder thermally treated to 1151K | $a_H$: 0.997191 nm, $c_H$: 1.07323 nm $a_R$: 0.677823 nm, $α_R$: 94.7132° unit cell volume = 924.2306 × 10⁻³ nm³ | 0.3% Mo + 1.8% $MoO_2$ + 1.7% $MoSe_2$ + 96.2% $Cu_2Mo_6Se_8$ |
| 30 min mechanically milled powder thermally treated to 1151K with 30 min hold at 1151K | $a_H$: 0.972965 nm, $c_H$: 1.092789 nm $a_R$: 0.669508 nm, $α_R$: 93.2087° unit cell volume = 895.9042 × 10⁻³ nm³ | 0.2% Mo + 1.9% $MoO_2$ + 1.7% $MoSe_2$ + 96.2% $Cu_2Mo_6Se_8$ |

TABLE 5-continued

Calculated lattice parameter(s) of $Cu_xMo_6Se_8$ phase

| Condition | Lattice parameter(s) of $Cu_2Mo_6Se_8$ | Quantitative Phase formation (%) |
|---|---|---|
| 3 h mechanically milled powder thermally treated to 1273K with 5 h hold at 1273K | $a_H$: 1.002506 nm, $c_H$: 1.07251 nm $a_R$: 0.680305 nm, $\alpha_R$: 94.9202° unit cell volume = 933.4816 × $10^{-3}$ nm$^3$ | 1.8% $MoO_2$ + 1.7% $MoSe_2$ + 96.5% $Cu_2Mo_6Se_8$ |

Phase Formation and Electrochemical Activity of HEMM Derived De-Cuprated $Mo_6Se_8$ The de-cuprated Mo6Se8 phase was obtained by complete copper leaching from Cu2Mo6Se8 phase formed at 1151K with 30 minutes dwell time at the peak temperature. The XRD patterns analysis confirmed the formation of Mo6Se8 phase along with minor MoO2 and unreacted MoSe2 phase. The major Braggs peaks matched with the standard Mo6Se8 pattern (ICDD: 01-085-0455) suggested copper was completely removed. SEM image of the Mo6Se8 phase showed particles of submicron to micrometer size. Electrochemical performance of the 80 wt. % Mo6Se8: 10 wt. % Super-P:10 wt. % PVDF composite electrode was evaluated in a 2016 coin cell. The electrochemical test showed 1st cycle discharge (magnesiation) and charge (de-magnesiation) capacity was ~58.5 mAhg−1 and ~64 mAhg−1 with Coulombic efficiency ~91.5%. In the 2nd cycle discharge and charge capacity was ~59.4 mAhg−1 and ~70.5 mAhg−1 and in the 3rd cycle ~63.8 mAhg−1 and ~75.5 mAhg−1, respectively. It is apparent from the voltage profile that a single voltage plateau was observed during 1st cycle discharge (~0.85V) and charge (~1.17V) whereas 2-steps magnesiation at ~1.05V and ~0.97V and de-magnesiation reactions at ~1.1V and ~1.17V were evident in the 2nd and 3rd cycle. The detailed subtle differences in the charge-storage mechanisms into Mo6Se8 phase from the 1st cycle and the subsequent cycles are discussed later herein. However, the competitive electrochemical data of de-cuprated Mo6Se8 phase obtained from Cu2Mo6Se8 phase formed at 30 minutes suggested the ease of synthesis of selenium CP.

The fully crystalline, Cu2Mo6Se8 ternary CP was also obtained upon heating the 3 hours mechanically milled sample at ~1273K with additional 30 minutes dwell time at peak temperature. The XRD pattern of 3 hours mechanically milled powder thermally treated at ~1273K with 5 hours dwell time at peak temperature showed the formation of Cu2Mo6Se8 phase along with MoSe2 and MoO2 as impurities (Table 5). De-cuprated Mo6Se8 was obtained by complete leaching of copper using a 6 molar HCl solution under oxygen bubbling for 7 hours. The lattice parameter(s) of Cu2Mo6Se8 was calculated using least-square method and are shown in Table 5. The lattice parameter(s) of Cu2Mo6Se8 was in good agreement with standard unit cell parameter(s). Whereas, lattice parameter(s) of de-cuprated Mo6Se8 (a=0.955858 nm, c=1.116432 nm, unit cell volume=883.3835×10−3 nm3) was found in excellent agreement with the standard Mo6Se8 (ICDD number: 01-085-0455; a=0.95488 nm, c=1.12095 nm, unit cell volume=884.40×10−3 nm3) unit cell parameters suggested that copper was completely removed by HCl treatment from the Cu2Mo6Se8 phase. The SEM image of Cu2Mo6Se8 and de-cuprated Mo6Se8 are showed irregular shaped submicron size particles were formed in the case of Cu2Mo6Se8 phase which retained its morphology completely in the de-cuprated Mo6Se8 phase. The HRTEM lattice fringe spacing was calculated as ~0.668 nm and ~0.35 nm corresponded to the interplanar d-spacing of (101) and (202) planes for Cu2Mo6Se8 and ~0.666 nm for Mo6Se8 corresponding to the interplanar d-spacing of (101) plane (hexagonal crystal system: space group R-3).

The composite electrode consisted of 80 wt % Mo6Se8 phase (−325 mech) with 10 wt % Super-P carbon additive and 10 wt % PVDF binder. It was tested in a 2016 coin cell setup as a cathode and polished Mg foil as anode separated by a Celgard® separator soaked in 2(PhMgCl)—AlCl3/tetrahydrofuran electrolyte. It showed good electrochemical performance. The cyclic voltammogram, acquired at a sweep rate of 0.1 mVs−1 between 0.5-1.5V versus Mg/Mg2+ couple, showed a typical two-step reversible magnesiation/demagnesiation phenomena where magnesiation occurred at ~1.04V, and ~0.96V and demagnesiation at ~1.11V, and ~1.18V, respectively. The anodic/cathodic peaks matched well with the theoretical calculation of the magnesiation/demagnesiation voltage. It was noted that magnesium intercalation/de-intercalation phenomena from Mo6Se8 phase was completely reversible and no partial Mg-ion trapping occurred MgxMo6S8 phase due to higher polarizability of selenium anionic framework. The electrochemical performance of Mo6Se8 composite electrode as well as Mo6Se8-graphite (7:3 weight ratio) in situ composite electrode were compared when tested at a current rate of 20 mAg−1. The galvanostatic cycling of Mo6Se8 composite electrode showed 1st cycle discharge (magnesiation) and charge (demagnesiation) capacity of ~83.5 mAhg−1 (~95% of theoretical capacity −88 mAhg−1) and ~76.3 mAhg−1 with Coulombic efficiency ~91.4%. Between 2nd and 100th cycle, average discharge and charge capacity of ~71.2mAg−1 and 74.2mAg−1 was observed with ~96% Coulombic efficiency. The gradual fade in capacity from 2nd to 100th cycle accompanied by ~4% irreversible loss per cycle was due to change in the crystal structure of magnesiated Mo6Se8 from rhombohedral ($R\bar{3}$) to triclinic ($P\bar{1}$) phase and loss in electronic and ionic conductivity. Mg1Mo6Se8 and Mg2Mo6Se8 crystallized into triclinic form at room temperature by cation displacement or due to cation ordering of crystal structure which caused expansion of the unit cell and resulted in loss of electrical contact of active mass with current collector. The calculated molar volume of Mo6Se8 (R0), Mg1Mo6Se8 (T1) and Mg2Mo6Se8 (T2) phase were ~88.78 cm3/mol, ~184.38 cm3/mol, and ~195.63 cm3/mol, respectively. R0 to T1 transformation was associated with ~107% cell volume expansion which may cause loss of electrical contact between the active mass and current collector as well as inherently poor electronic and ionic conductivity of the triclinic Chevrel phase resulted in ~4% capacity fade. In the Mg2Mo6Se8 phase, both the Mg-ions were located in the tetrahedral sites of outer ring of cavity 2 and formed a new type of cationic arrangements. The structural rearrangement occurred where four cation sites (2 tetrahedra and two square-pyramids) in cavity 1 for Mg1Mo6Se8 degenerated into six tetrahedral sites. Thus, it appeared that triclinic phase (T1 and T2) suitable for Mg-ion diffusion and free from any charge trapping lost its capacity gradually due to poor ionic/electronic conductivity of the magnesiated Mo6Se8 phase.

To counteract the loss in electronic/ionic conductivity and associated capacity fade, a bottom-up approach was employed. First, Mo6Se8 particles embedded within the graphitic matrix were obtained using synthetic graphite during milling operation. 70 wt % of (2CuSe+3Mo+

3MoSe2) powder with 30 wt % synthetic graphite (Aldrich, 1-2 μm) was mechanically milled for 3 hours and subjected to thermal treatment at ~1273K with 5 hours dwell time at the peak temperature. The XRD patterns of the milled, thermal-treated and copper leached powder showed the presence of elemental Mo, MoSe2, and CuSe phase along with the high intensity peak from (003) plane of graphite at 2☐ value 26.310 ○ of the 3 hours milled powder. The 3 hours milled powder when heated to ~1273K under argon atmosphere showed the formation of fully crystalline Cu2Mo6Se8+graphite phase along with unreacted MoSe2. Further, copper was leached and Mo6Se8+graphite (7:3) phase was obtained. It can be seen from the three XRD patterns that peak from (003) plane of graphite was present. However, the peak intensity decreased and indicated the collapse of microcrystalline graphite structure and formation of an amorphous disordered carbon due to defect induced melting commonly observed during high energy mechanical milling.

The electrochemical performance of the in situ Mo6Se8+graphite (7:3) when evaluated in a 2016 coin cell showed significantly improved performance compared to Mo6Se8 electrode. Although the capacity of in situ Mo6Se8+graphite (7:3) electrode was lower than Mo6Se8 electrode due to 70% active mass, it showed an extremely stable capacity up to 100 cycle. The 1st cycle discharge and charge capacity was ~69.3 mAhg−1 and ~54.8 mAhg−1 with ~79.1% Coulombic efficiency. Between 2nd and 100th cycle, average discharge and charge capacity of ~50.43 mAhg−1 and 50.4 mAhg−1 was observed with ~99.93% Coulombic efficiency. From the above study, it was inferred that graphite provided the required electronic path for Mg-ion intercalation/de-intercalation to occur reversibly form the Mo6Se8 phase and improve the Coulombic efficiency from ~96% to ~99.93%. Capacity versus voltage profile of 1st, 2nd, 3rd, 4th, 15th, and 100th cycle of $Mo_6Se_8$ and $Mo_6Se_8$+in situ graphite (7:3) showed exactly similar two-steps magnesiation at ~0.96V and ~1.03V and demagnesiation reaction plateaus at ~1.11V and ~1.18V was in agreement with cyclic voltammetry data. However, the 1st cycle magnesiation required slightly overvoltage and a single sloping reaction plateau was observed at ~0.85V and de-magnesiation occurred at ~1.15V and ~1.20V due to kinetic barrier that existed in the Chevrel phase host. Rate retention of Mo6Se8 electrode was also good, at C/4, 3C/8, C/2, 3C/4, 1C (1C~80 mAg−1), 3C/2, and 2C current rate average discharge capacity of ~71.3 mAhg−1, ~60.5 mAhg−1, ~56.2 mAhg−1, ~51.7 mAhg−1, ~47.7 mAhg−1, ~41.9 mAhg−1, and ~31.2 mAhg−1 was achieved with Coulombic efficiency ~96.1%, ~97.5%, ~98.7%, ~99.5%, ~99.3%, ~99.8%, and ~99.9%, respectively. From the above study it appears that HEMM approach is also suitable for rapid synthesis of Cu2Mo6Se8 Chevrel phase, another potential cathode for rechargeable magnesium battery.

Conclusion

High energy mechanical milling is a suitable approach for preparing ternary Chevrel phase (Cu2Mo6Z8; Z=S, Se) using metal and metal sulfide as precursors. Cu2Mo6S8 was synthesized from CuS, Mo and MoS2 composition by using higher energy mechanical milling approach. Mechanical milling of 2CuS+3Mo+3MoS2 stoichiometric composition for 30 minutes to 3 hours formed a homogeneous mixture which upon heating at elevated temperature formed the desired ternary phase. Quantitative X-rays diffraction study showed ~98% Cu2Mo6S8 phase could be obtained with 30 minutes of milling followed by thermal treatment at 1123K for 30 minutes under argon. SEM images showed the formation of submicron to micrometer sized agglomerated particles. TG-DSC curves were able to show that elemental Mo reacted with CuS and nucleated the Cu1.83Mo3S4 phase first which further reacted with MoS2, and unreacted Mo and formed the desired Cu2Mo6S8 phase. Electrochemical performance of de-cuprated Mo6S8 phase in a magnesium battery exhibited competitive performance where magnesiation and de-magnesiation was observed at ~1.0V and ~1.28V respectively. Galvanostatic cycling data showed the 1st cycle discharge and charge capacity of ~92 mAhg−1 and ~57 mAhg−1 with Coulombic efficiency ~62%. $Mo6S_8$ electrode was able to deliver a sp. capacity ~70 mAhg−1 up to 330 cycles with 99% Coulombic efficiency in a coin cell setup demonstrated the structural integrity of the HEMM-derived Mo6S8 phase. Cu2Mo6Se8 phase was also synthesized by thermal treatment of the milled powder at 1151K for 30 minutes with ~96% yield with unreacted Mo, MoSe2 and MoO2 as minor impurities. Electrochemical data of Mo6Se8 electrode showed a two-step magnesiation (at ~1.04V and ~0.96V) and de-magnesiation (at ~1.11V and ~1.18V) phenomena. Galvanostatic cycling of Mo6Se8 electrode showed 1st cycle discharge and charge capacity of ~83.5 mAhg−1 and ~76.3 mAhg−1, respectively with ~91.4% Coulombic efficiency. A stable discharge and charge capacity of ~71.2 mAhg−1 and ~74.2 mAhg−1 was observed with 4% fade per cycle likely due to ~107% stress generated at the electrode due to change in the crystal structure of magnesiated Mo6Se8 from rhombohedral (R$\bar{3}$) to triclinic (P$\bar{1}$) phase and resulted loss in electrical path of active mass with current collector. Conductive carbon matrix embedded Mo6Se8 particles generated via milling approach were capable of salvaging the fade in capacity and a stable sp. capacity of ~50 mAhg−1 was observed up to 100 cycle with ~0.07% fade per cycle using graphite and PMAN as carbon source.

In summary, sulfur and selenium ternary CPs synthesized by the time saving, scalable HEMM approach, and binary CPs obtained by acid leaching copper thereafter were shown as cycle stable Mg-ion battery cathodes suitable for electrical energy storage applications.

Whereas particular embodiments of the invention have been described herein for purposes of illustration, it will be evident to those skilled in the art that numerous variations of the details may be made without departing from the invention as set forth in the appended claims.

What is claimed is:

1. An electrochemical cell, comprising:
   an alkali-metal-containing anode;
   a cathode, comprising:
      a Chevrel-phase material of a formula $Mo_6Z_8$ wherein Z is a chalcogen with or without a presence of oxygen; and
   an electrolyte comprising 3-bis(trimethylsilyl)aminophenyl magnesium chloride with aluminum chloride.

2. The electrochemical cell of claim 1, wherein the alkali-metal-containing anode comprises magnesium.

3. The electrochemical cell of claim 1, wherein the metallic element is selected from the group consisting of Li, Na, Mg, Ca, Sc, Cr, Mn, Fe Co, Ni, Cu, Zn, Sr, Y, Pd, Ag, Cd, In, Sn, Ba, La, Pb, Ce, Pr, Nd, Sm, Eu, Gd, Tb, Dy, Ho, Er, Tm, Yb, Lu and mixtures thereof.

4. The electrochemical cell of claim 1, wherein the chalcogen Z is selected from chemical elements in Periodic Table Group 16.

5. The electrochemical cell of claim 1, wherein Z is selected from the group consisting of sulfur, selenium, tellurium and mixtures thereof.

6. The electrochemical cell of claim 1, wherein M is copper, x is 2 and Z is sulfur.

7. The electrochemical cell of claim 1, wherein M is copper, x is 2 and Z is selenide.

8. The electrochemical cell of claim 1, wherein the precursor material is formed from a mixture of MZ, $MoZ_2$ and molybdenum.

9. The electrochemical cell of claim 1, wherein the Chevrel-phase material is of a formula $Mo_6S_8$ which is derived from the ball-milled powder precursor material of a formula $Cu_2Mo_6S_8$, and said ball-milled powder precursor material is derived from a mixture of ammonium tertathiomolybdate and anhydrous copper chloride in the presence of anhydrous N,N-dimethylformamide.

10. The electrochemical cell of claim 1, wherein the electrolyte comprises amidomagnesium-based magnesium salt transmetallated with aluminum salt.

11. The electrochemical cell of claim 1, wherein the electrolyte comprises a solution of phenyl magnesium chloride-aluminum chloride and amidomagnesium-based magnesium salt transmetallated with an aluminum salt electrolyte.

12. The electrochemical cell of claim 1, wherein the electrolyte comprises a solution of 3-bis(trimethylsilyl)aminophenylmagnesium chloride with aluminum chloride in tetrahydrofuran.

13. The electrochemical cell of claim 1, wherein said electrochemical cell is a rechargeable battery.

14. A method of synthesizing a Chevrel-phase cathode material, comprising:

combining stoichiometric amounts of copper (II) sulfide, molybdenum, molybdenum disulfide to form a mixture;

high energy mechanically milling the mixture;

forming a high energy mechanically milled powder precursor of a formula $Cu_2Mo_6S_8$, with or without a presence of oxygen; and removing a copper element from the high energy mechanically milled powder precursor to form a Chevrel-phase cathode material of a formula $Mo_6S_8$.

15. A magnesium ion rechargeable battery comprising:

an alkali-metal-containing anode;

a cathode, comprising:

a Chevrel-phase material of a formula $Mo_6Z_8$ wherein Z is a chalcogen with or without a presence of oxygen; and an electrolyte comprising 3-bis(trimethylsilyl)aminophenyl magnesium chloride with aluminum chloride.

* * * * *